United States Patent
De Lagrange et al.

(10) Patent No.: US 12,212,757 B2
(45) Date of Patent: Jan. 28, 2025

(54) QUANTIZATION PARAMETER CODING

(71) Applicant: InterDigital CE Patent Holdings, SAS, Paris (FR)

(72) Inventors: Philippe De Lagrange, Betton (FR); Fabrice Leleannec, Betton (FR); Fabrice Urban, Thorigne Fouillard (FR); Karam Naser, Mouazé (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 17/788,613

(22) PCT Filed: Dec. 23, 2020

(86) PCT No.: PCT/EP2020/087768
§ 371 (c)(1),
(2) Date: Jun. 23, 2022

(87) PCT Pub. No.: WO2021/130314
PCT Pub. Date: Jul. 1, 2021

(65) Prior Publication Data
US 2023/0045182 A1    Feb. 9, 2023

(30) Foreign Application Priority Data
Dec. 23, 2019 (EP) .................................... 19306753

(51) Int. Cl.
*H04N 19/136* (2014.01)
*H04N 19/70* (2014.01)

(52) U.S. Cl.
CPC ........... *H04N 19/136* (2014.11); *H04N 19/70* (2014.11)

(58) Field of Classification Search
CPC .................................................. H04N 19/136
(Continued)

(56) References Cited

U.S. PATENT DOCUMENTS

2014/0079135 A1*  3/2014  Van der Auwera .... H04N 19/96
                                                        375/240.18
2020/0162735 A1*  5/2020  Ueno .................... H04N 19/124

FOREIGN PATENT DOCUMENTS

WO      2014/043516 A1    3/2014

OTHER PUBLICATIONS

Bross et al., "Versatile Video Coding (Draft 7)", JVET-P2001-V9, Editors, Joint Video Experts Team (JVET) of ITU-T SG 16 WP 3 and ISO/IEC JTC 1/SC 29/WG 11, 16th Meeting: Geneva, CH, Oct. 1-11, 2019, 491 pages.

(Continued)

*Primary Examiner* — Amir Shahnami
(74) *Attorney, Agent, or Firm* — Condo Roccia Koptiw LLP

(57) ABSTRACT

An apparatus for processing a video may receive a quantization parameter (QP) adjustment value associated with a syntax level at the syntax level. In examples, the apparatus may obtain the QP adjustment value associated with the syntax level, for example, via signalling at the syntax level. The apparatus may apply the QP adjustment value to a QP associated with the syntax level to obtain an adjusted QP associated with the syntax level. The syntax level may include a coding block level or a transform unit (TU) level. In examples, if the syntax level is a TU level, the decoder may receive the QP adjustment value for a first CU (for example, a current TU) and obtain a QP for the second TU that precedes the first CU in a coding order based on a QP predictor, for example, instead of the QP adjustment value for the first TU.

20 Claims, 19 Drawing Sheets

(58) Field of Classification Search
USPC .................................................. 375/240.02
See application file for complete search history.

(56) References Cited

OTHER PUBLICATIONS

Heng et al., "AHG16: Changing cu_qp_delta Signalling to Facilitate VDPU-Level Processing", JVET-O0046-V1, Broadcom Inc., Joint Video Experts Team (JVET) of ITU-T SG 16 WP 3 and ISO/IEC JTC 1/SC 29/WG11, 15thMeeting: Gothenburg, SE, Jul. 3-12, 2019, pp. 1-5.

Kapsenberg et al., "DQP Buffering Fix", JCTVC-K0112, Intel Corp, Qualcomm Inc., Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012, pp. 1-12.

Lagrange et al., "AHG15: Defining QP at TU Level", JVET-Q0474-v2, InterDigital, Joint Video Experts Team (JVET) of ITU-T SG 16 WP 3 and ISO/IEC JTC 1/SC 29/WG 11, 17th Meeting: Brussels, BE, Jan. 7-17, 2020, pp. 1-7.

Lagrange et al., "CE7-Related: Quantization Group Size Uniformity", JVET-M0113, Technicolor, Joint Video Experts Team (JVET) of ITU-T SG 16 WP 3 and ISO/IEC JTC 1/SC 29/WG 11, 13th Meeting: Marrakech, MA, Jan. 9-18, 2019, 10 pages.

Wiegand et al., "Draft ITU-T Recommendation and Final Draft International Standard of Joint Video Specification (ITU-T Rec. H.264 | ISO/IEC 14496-10 AVC)", JVT-G050R1, Editor, Joint Video Team (JVT) of ISO/IEC MPEG & ITU-T VCEG (ISO/IEC JTC1/SC29/WG11 and ITU-T SG16 Q.6), 8th Meeting: Geneva, Switzerland, May 23-27, 2003, 269 pages.

Zhao et al., "AHG15: On CU Adaptive Chroma QP Offset Signalling", JVET-P0436, oint Video Experts Team (JVET) of ITU-T SG 16 WP 3 and ISO/IEC JTC 1/SC 29/WG 11 Geneva, CH, Oct. 1-11, 2019, 5 pages.

* cited by examiner

QUANTIZATION PARAMETER CODING

CROSS REFERENCE TO RELATED APPLICATIONS

This application is the National Stage Entry under 35 U.S.C. § 371 of Patent Cooperation Treaty Application No. PCT/EP2020/087768, filed Dec. 23, 2020, which claims priority to EP Provisional patent application Ser. No. 19/306, 753.5, filed on Dec. 23, 2019, and entitled "Quantization Parameter Coding," the entireties of which are incorporated by reference as if fully set forth herein.

BACKGROUND

Video coding standards may improve coding efficiency (for example, compression efficiency) and may support the quantization step of video compression. Video coding systems may be used to compress digital video signals. Compressed digital video signals may reduce the storage need and/or transmission bandwidth of the signals. Video coding systems may include a block-based system, a wavelet-based system, an object-based system, a block-based hybrid video coding system, and/or the like.

SUMMARY

Described herein are systems, methods, and instrumentalities associated with quantization parameter (QP) coding (for example, encoding and/or decoding). A QP adjustment value may be defined and/or signaled at a syntax level and applied at the same syntax level. A QP adjustment value (for example, a local QP adjustment) may be signaled at the transform unit (TU) level for adjusting QP in a quantization group (QG). A QP adjustment value (for example, a local QP adjustment) may be signaled at the coding unit (CU) for adjusting a QP in a QG. A QG may include one or more CUs or TUs. A CU may include one or more TUs.

For example, a decoder may receive, for a coding tree, an indication that a QP adjustment value is present (for example, a QP-delta is present in a TU). The decoder may receive a QP adjustment value associated with a TU level (for example, a TU QP adjustment value) for a TU in a QG. The decoder may determine an adjusted QP associated with the TU level (for example, a QP for the TU) based on the QP adjustment value associated with a TU level received for the TU. The adjusted QP associated with the TU level (for example, the determined QP for the TU) may be used to predict QPs for subsequent TUs (for example, subsequent TUs in a coding order in the QG). For example, the adjusted QP associated with the TU level may be used as the QP predictor for subsequent TUs in a QG until the end of the QG. The QP(s) of the preceding TUs (for example, TUs that precede the current TU in a coding order in the same CU) may be determined independent of the TU QP adjustment value received for the current TU. For example, the QP(s) of one or more of the preceding TUs may be predicted based on a slice level QP. For example, the QP(s) of one or more of the preceding TUs may be predicted based on the QP of a previous TU in a previous QG in a decoding order. For example, one or more of preceding TUs may use QP(s) of transform unit(s) in one or more neighboring blocks as the QP predictor. The decoder may process a video (for example, perform dequantization on one or more TUs) based on the respective QPs of the one or more TUs. The decoder may determine whether to use the adjusted QP for the current TU on another TU based on a coding order associated with the current TU and that another TU. On a condition that that another TU follows the current TU in the coding order, the adjusted QP for the current TU may be used on that another TU. On a condition that that another TU precedes the current TU in the coding order, the QP for the second TU may be determined based on a QP predictor.

For example, the decoder may determine whether to receive a TU QP adjustment value indication based in part on a width and/or a height of the transform block associated with the TU. The decoder may determine to receive a TU QP adjustment value indication for example, if the width and/or height of the transform block associated with the TU is less than a predetermined value. The decoder may determine whether to receive a TU QP adjustment value indication, for example, based in part on a size of the transform block associated with the TU. The decoder may determine to receive a TU QP adjustment value indication, for example, if the size of the transform block associated with the TU is less than a predetermined value.

For example, a decoder may receive a QP adjustment indication (for example, a local QP adjustment indication such as a QP-delta) at CU level. The decoder may determine whether to receive the CU level QP adjustment indication based on one or more conditions (for example, the presence of non-zero residual coefficients). The decoder may receive a local QP adjustment (for example, a QP-delta) for a current CU and use the QP adjustment value for determining luma QP(s) and/or chroma QP(s) for the subsequent CUs in the QG (for example, in a coding order until the end of the QG). The QP(s) of the subsequent CUs in the QG may be determined based on the received QP adjustment value.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1:
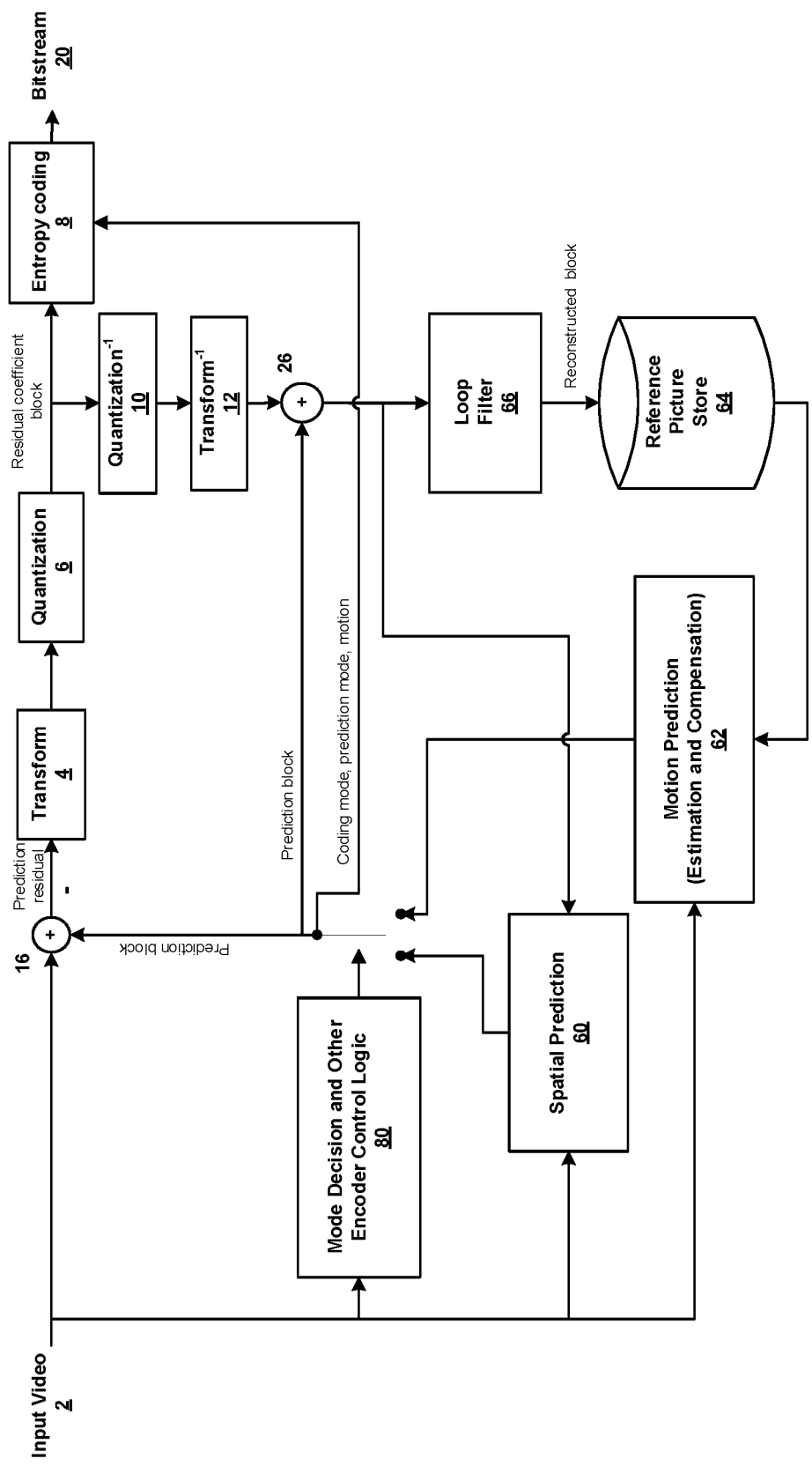
FIG. 1 is a diagram illustrating an example of a video encoder.

A video coding framework (for example, a block-based hybrid video coding framework) may be provided. FIG. 1 is a diagram illustrating an example of a video encoder. FIG. 1 shows a block diagram of an example block-based video encoding framework (for example, a video encoder such as an encoder implemented or installed in a WTRU). The input video signal 2 may be processed block by block. The blocks (for example, coding tree units (CTUs) with extended block sizes) may comprise high resolution (for example, 4K or 2160p and beyond) video signals. For example, a CTU may include 128×128 pixels or more. A CU may be partitioned into coding units (CUs) for prediction (for example, as prediction units (PUs)), and/or transform coding (for example, as transform units (TUs)). The CU, PU, and TU may or may not have the same block size. The CU, PU, and TU may not have the same block size, for example when a maximum supported transform length is smaller than the width or the height of the color component of the CU.

For a (for example, each) input video block (for example, a CU), spatial prediction 60 and/or temporal prediction (for example, motion prediction) 62 may be performed. Spatial prediction (for example, intra prediction) may use pixels from samples of coded neighboring blocks (for example, reference samples) in the video picture/slice to predict the current video block. Spatial prediction may reduce spatial redundancy, for example, that may be inherent in the video signal. Temporal prediction (for example, inter prediction and/or motion compensated prediction) may use reconstructed pixels from the coded video pictures, for example, to predict the current video block. Temporal prediction may reduce temporal redundancy, for example, that may be inherent in the video signal. Temporal prediction signals for a video block may be signaled by one or more motion vectors and/or may indicate the amount and/or the direction of motion between the current block and/or the current block's reference block. If multiple reference pictures are supported for a (for example, each) video block, the video block's reference picture index may be sent and/or the reference index may be used to identify from which reference picture in the reference picture store 64 the temporal prediction signal may be derived. After spatial and/or temporal prediction, the mode decision block 80 in the encoder may determine a prediction mode (for example, the best prediction mode), for example, based on a rate-distortion optimization. The prediction block may be subtracted from the current video block 16 and/or the prediction residual may be de-correlated using transform 4 and/or quantization 6. The quantized residual coefficients may be inverse quantized 10 and/or inverse transformed 12, for example, to form the reconstructed residual, which may be added to the prediction block 26, for example, to form the reconstructed video block. In-loop filtering (for example, a de-blocking filter and/or Adaptive Loop Filters) may be applied 66 on a reconstructed video block before the reconstructed video block may be put in the reference picture store 64 and/or used to code video blocks (for example, future video blocks). To form the output video bit-stream 20, coding mode (for example, inter or intra), prediction mode information, motion information, and/or quantized residual coefficients may be sent (for example, may all be sent) to the entropy coding unit 8, for example, to be compressed and/or packed to form the bit-stream.

Figure 2:
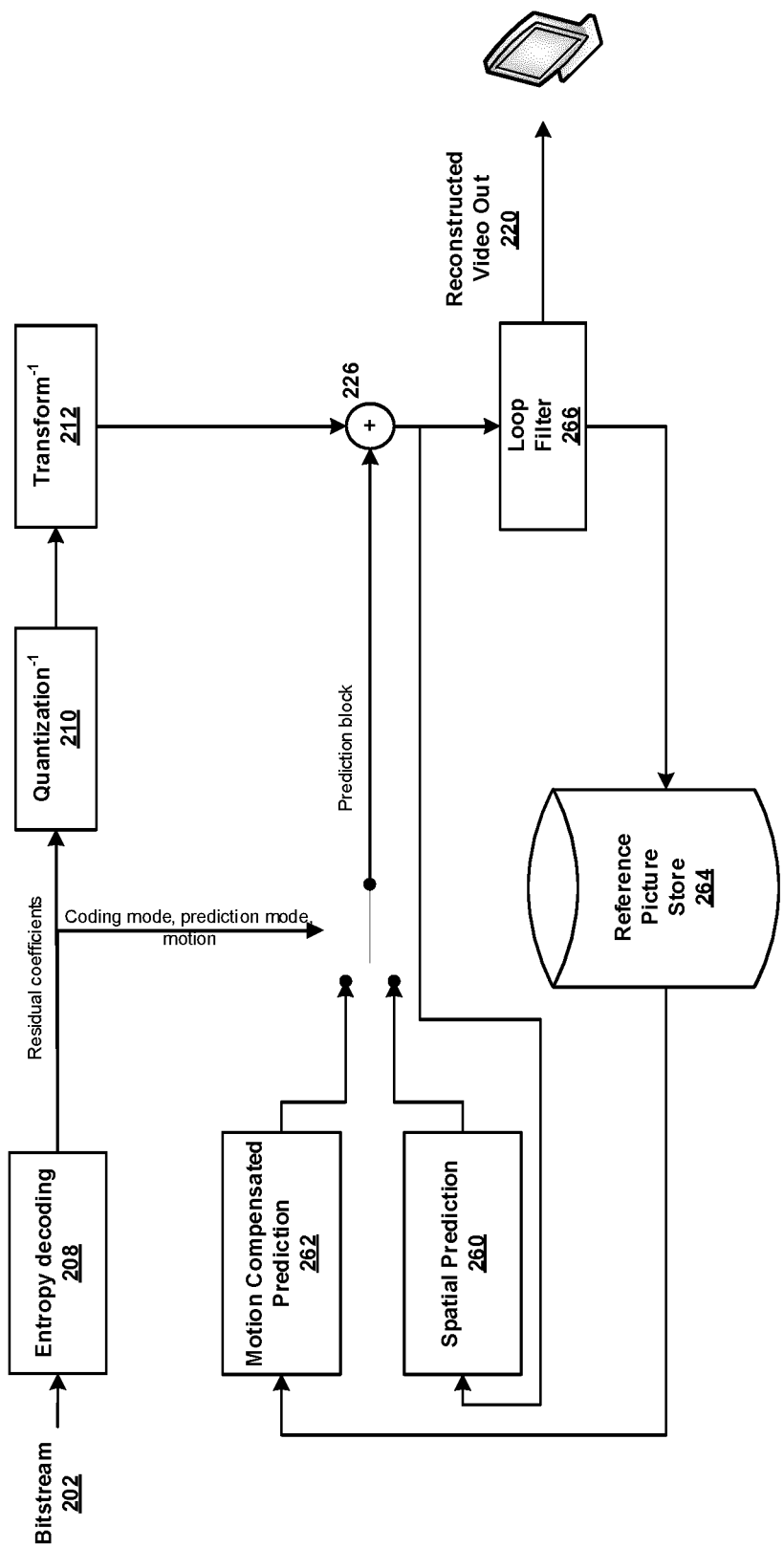
FIG. 2 is a diagram illustrating an example of a video decoder.

FIG. 2 is a diagram illustrating an example of a video decoder (for example, a block-based video decoder) such as a decoder implemented or installed in a WTRU. The video bit-stream 202 may be unpacked (for example, first unpacked) and/or entropy decoded at entropy decoding unit 208. The coding mode and prediction information may be sent to the spatial prediction unit 260 (for example, if intra coded) and/or to the temporal prediction unit 262 (for example, if inter coded) to form the prediction block. The residual transform coefficients may be sent to inverse quantization unit 210 and/or to inverse transform unit 212, for example, to reconstruct the residual block. The prediction block and/or the residual block may be added together at 226. The reconstructed block may go through in-loop filtering 266, for example, before the reconstructed block is stored in reference picture store 264. The reconstructed video in the reference picture store may be sent to drive a display device (for example, as shown in 220) and/or used to predict video blocks (for example, future video blocks).

A picture may be divided into one or more rows and/or columns of tiles. A tile may comprise a sequence of coding tree units (CTUs) that may cover a rectangular region of a picture. A tile may be divided into one or more bricks and each brick may comprise one or more rows of CTUs of the tile.

A sub-picture may comprise one or more slices that may collectively cover a region (for example, a rectangular region) of a picture. A slice may be a rectangular slice, a raster scan slice, etc. A raster scan slice (for example, generated and/or used in a raster scan slice mode) may comprise one or more tiles (for example, a sequence of tiles) in a tile raster scan of a picture. A rectangular slice (for example, generated and/or used in a rectangular slice mode) may comprise one or more bricks of a picture that may collectively form a region (for example, a rectangular region) of the picture. The bricks within a rectangular slice may be arranged in the order of brick raster scan of the slice.

Figure 3:
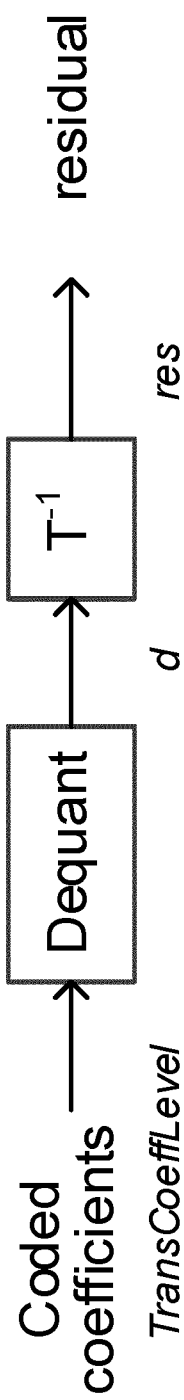
FIG. 3 illustrates an example of a general functional diagram of scaling and transformation process.

Scaling (for example, dequantization) and/or transformation may be performed. FIG. 3 illustrates an example of a general functional diagram of scaling (for example, de-quantization) and transformation process. As illustrated in FIG. 3, one or more coded coefficients of a given transform block (for example, TransCoeffLevel) may go through de-quantization (for example, Dequant) to generate scaled transformed coefficients (for example, d), and inverse transform (for example, $T^{-1}$), resulting in the residual (for example, residual samples) for the transform block (for example, res).

Figure 4:
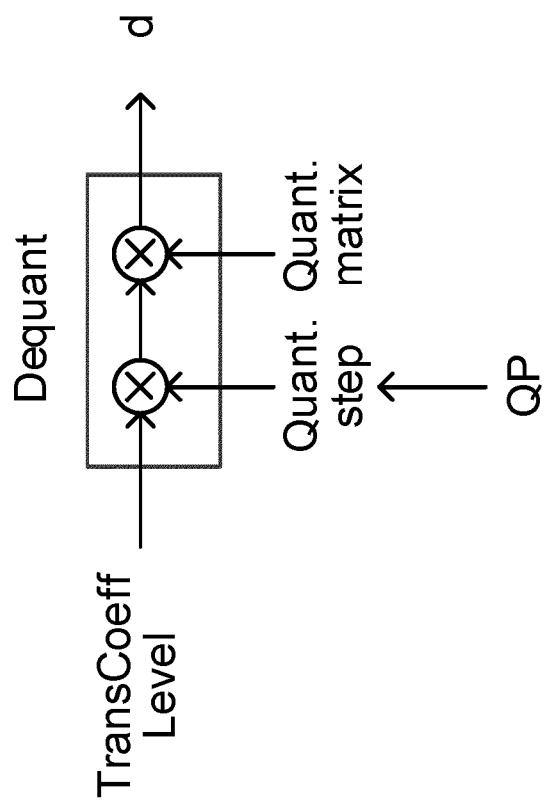
FIG. 4 illustrates an example of dequantization.

FIG. 4 illustrates an example of dequantization. A scaling (for example, de-quantization) process may include performing a de-quantization of the transformed coefficients using a quantization step (for example, qStep) and/or a quantization matrix, (for example, m[ ][ ]), resulting in dequantized coefficients (for example, d[ ][ ]). Eq. 1 illustrates an example of scaling the transformed coefficients (for example, ignoring the dependent quantization feature and other minor variants). Eq. 1 may change by taking into account of the dependent quantization feature and/or other minor variants. Eq. 1 may relate to luma.

$$d[x][y]=\text{Clip3}(\text{coeffMin},\text{coeffMax},((\text{TransCoeffLevel}[xTbY][yTbY][cIdx][x][y]*m[x][y]*\text{levelScale}[qP\%6]<<(qP/6))+(1<<(bd\text{Shift}-1)))>>bd\text{Shift})$$ Eq. 1

TransCoeffLevel[ . . . ] may be the transformed coefficients' absolute values (for example, for the current block) identified by its spatial coordinates xTbY, yTbY and its component index cIdx. x and y may be the horizontal/vertical frequency indices. qP may be the quantization parameter (for example, the current quantization parameter). Multiplication by levelScale[qP %6] and left shift by (qP/6) may be the equivalent of the multiplication by a quantization step (for example, qStep=(levelScale[qP %6]<<(qP/6))). m[ . . . ][ . . . ] may be the two-dimensional quantization matrix. bdShift may be an additional scaling factor (for example, to account for image sample bit depth). The term (1<<(bdShift−1)) may round to the nearest integer. d[ . . . ] may be the resulting dequantized transformed coefficients absolute values.

Figure 5:
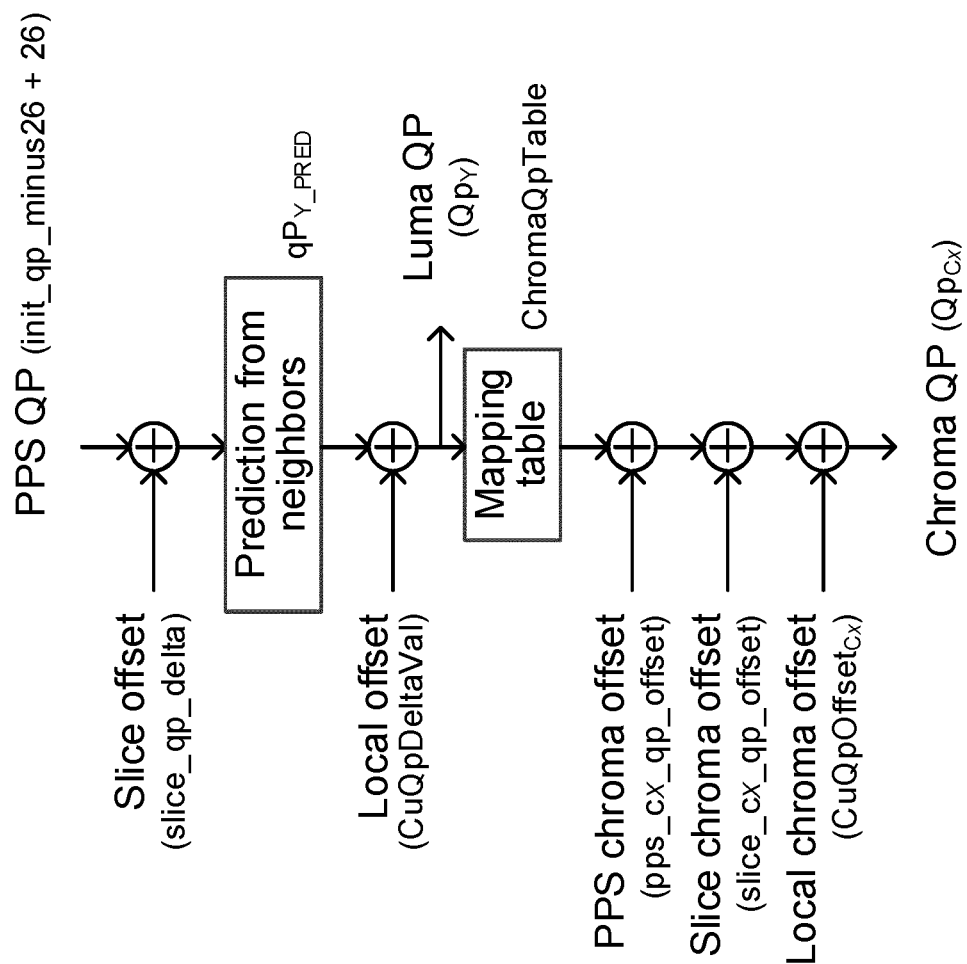
FIG. 5 illustrates an example of obtaining a QP (for example, QP derivation).

Quantization may be controlled, for example, based on a control of quantization parameter (QP) and/or quantization matrix associated with a unit. Quantization control may be the combination of syntax used to control the QP and the quantization matrix (for example, for a specific coded block). A QP may depend on various offsets (for example, QP adjusted values that can be specified at picture parameter set (PPS), picture, slice, CU, or TU level, depending on color component). FIG. 5 illustrates an example of obtaining a QP (for example, QP derivation). As shown in FIG. 5, a QP may be adjusted based on one or more of the offsets. As shown in FIG. 5, the offsets may include a QP delta and/or a chroma offset.

A QP may be determined based on a QP predictor. Luma QP may be determined based on a luma QP predictor (for example, $qP_{Y\_PRED}$) and a QP adjustment (for example, QP delta) value, for example, to obtain an adjusted QP. In examples, an adjusted QP (for example, $Qp_Y$)=a QP predictor (for example, $qP_{Y\_PRED}$)+a QP adjustment value (for example, CuQpDeltaVal). A QP predictor (for example, $qP_{Y\_PRED}$) may initially be set to a QP value for the slices of a picture (for example, SliceQpY). SliceQpY may be determined based on an initial QP value of SliceQpY and QP adjustment value assigned to a slice (for example, the coding blocks in the slice). SliceQpY=26+init_qp_minus26+QP adjustment value (for example, slice_qp_delta). A QP predictor (for example, $qP_{Y\_PRED}$) may be shared by a group of CUs (for example, called Quantization Group (QG)). The QG may include at least one unit (for example, a first TU and a second TU). A QP predictor for a current unit may be determined based on a QP for at least one unit that is adjacent to the current QG. A QP predictor (for example, $qP_{Y\_PRED}$) may be derived as the average of the QPs of the left and top neighboring blocks ($qP_{Y\_A}$ and $qP_{Y\_B}$), for example, on the top-left corner of the current QG. In examples, $qP_{Y\_PRED}=(qP_{Y\_A}+qP_{Y\_B}+1)>>1$. A QP adjustment value (for example, CuQpDeltaVal) may be specified (for example, once per QG) for a transform block that has non-zero coefficient(s). For example, a local QP adjustment value (for example, CuQpDeltaVal) may be specified, for example, as soon as a transform block has non-zero coefficient(s).

Chroma QP(s) may be determined based on associated luma QP(s) and chroma QP offset(s), for example, as shown in Eq. 2. The x of Cx may indicate the current chroma channel.

$$Qp_{Cx}=\text{ChromaQpTable}[x][Qp_Y]+qP_{Cx}+pps\_cx\_qp\_\text{offset}+\text{slice}\_cx\_qp\_\text{offset}+CuQp\text{Offset}_{Cx}.$$ Eq. 2

A set of quantization matrices may be signaled. A set of quantization matrices may be transmitted in an "Adaptation Parameter Set" which may be referred to (for example, in a given slice). An identifier may be used to select a quantization matrix from the set (for example, based on a block prediction mode(s) (intra, inter, intra block copy (IBC)), color component(s) (Y, Cb, Cr), and/or block size). Table 1 illustrates an example where the identifier of the selected matrix may be determined or specified (for example, based on block properties). The selected quantization matrix may be resized to match the block size.

TABLE 1

| an example where the identifier of a selected matrix may be used (for example, specified) | | | | | | |
|---|---|---|---|---|---|---|
| max(block width, block height) | | 2 | 4 | 8 | 16 | 32 | 64 |
| INTRA | Y | | | 2 | 8 | 14 | 20 | 26 |
| | Cb | | | 3 | 9 | 15 | 21 | 21 |
| | Cr | | | 4 | 10 | 16 | 22 | 22 |
| INTER, IBC | Y | | | 5 | 11 | 17 | 23 | 27 |
| | Cb | 0 | 6 | 12 | 18 | 24 | 24 |
| | Cr | 1 | 7 | 13 | 19 | 25 | 25 |
| Size of selected quantization matrix | | 2 × 2 | 4 × 4 | 8 × 8 | 8 × 8 + DC | | |

QP(s) may be adapted locally (for example, controlled locally). Qp adjustment values may be obtained via one or more syntax elements that are present in a syntax structure. Qp adjustment values (for example, variables CuQpDeltaVal and CuQpOffsetCx as used in examples herein) may be obtained from syntax elements that may be present in the transform_unit syntax structure (for example, cu_qp_delta_abs, cu_qp_delta_sign_flag, cu_chroma_qp_offset_flag and/or cu_chroma_qp_offset_idx), and/or an offset table for chroma, which may be signaled in the PPS.

In examples, Qp adjustment values (for example, the variables CuQpDeltaVal and CuQpOffsetCx) may be present, for example, if QP-delta signaling is enabled, transform coefficients are present (for example, CBF flags are true), and QP-delta has not yet been signaled within the same quantization group (controlled by IsCuQpDeltaCoded). Table 2 illustrates an example transform unit syntax table.

TABLE 2 example syntax in transform_unit structure

| | Descriptor |
|---|---|
| transform_unit( x0, y0, tbWidth, tbHeight, treeType, subTuIndex, chType ) { <br>   [...] <br>   if( ( CbWidth[ chType ][ x0 ][ y0 ] >64 \|\| CbHeight[ chType ][ x0 ][ y0 ] > 64 \|\| <br>      tu_cbf_luma[ x0 ][ y0 ] \|\| ( chromaAvailable && ( tu_cbf_cb[ xC ][ yC ] \|\| <br>      tu_cbf_cr[ xC ][ yC ] ) ) && treeType != DUAL_TREE_CHROMA ) { <br>     if( cu_qp_delta_enabled_flag && !IsCuQpDeltaCoded ) { <br>       cu_qp_delta_abs | ae(v) |
|       if( cu_qp_delta_abs ) <br>         cu_qp_delta_sign_flag | ae(v) |
|     } <br>   } <br>   if( ( CbWidth[ chType ][ x0 ][ y0 ] > 64 \|\| CbHeight[ chType ][ x0 ][ y0 ] > 64 \|\| <br>     ( chromaAvailable && ( tu_cbf_cb[ xC ][ yC ] \|\| tu_cbf_cr[ xC ][ yC ] ) ) ) && <br>     treeType != DUAL_TREE_LUMA ) { <br>     if( cu_chroma_qp_offset_enabled_flag && !IsCuChromaQpOffsetCoded) { <br>       cu_chroma_qp_offset_flag | ae(v) |
|       if( cu_chroma_qp_offset_flag && chroma_qp_offset_list_len_minus1 > 0 ) <br>         cu_chroma_qp_offset_idx | ae(v) |
|     } <br>   } <br>   [...] | |

A QG may define a minimum area covered by a coding tree node. The units in the QG (for example, the CUs inside the coding tree node) may use (for example, share) the same QP predictor. The QP predictor may include, for example, $qP_{Y\_PRED}$ as used in examples herein. A QP adjustment value (for example, QP-delta) may be signaled. In examples, at most one QP-delta may be signaled for a QG. The variable IsCuQpDeltaCoded may be reset to zero at the start of a QG. Table 3 illustrates an example of the syntax in a coding_tree structure.

TABLE 3 example syntax in a coding_tree structure

| | Descriptor |
|---|---|
| coding_tree( x0, y0, cbWidth, cbHeight, qgOnY, qgOnC, cbSubdiv, [...] ) { <br>   [...] <br>   if( cu_qp_delta_enabled_flag && qgOnY && cbSubdiv <= CuQpDeltaSubdiv ) { <br>     IsCuQpDeltaCoded = 0 <br>     [...] <br>   } <br>   if( cu_chroma_qp_offset_enabled_flag && qgOnC && <br>     cbSubdiv <= CuChromaQpOffsetSubdiv ) <br>     IsCuChromaQpOffsetCoded = 0 <br>     [...] | |

In Table 3, whether the minimum area condition is met may be determined based on the variables qgOnY, cbSubdiv, and/or CuQpDeltaSubdiv. The variable IsCuQpDeltaCoded may be set to one when (for example, as soon as) cu_qp_delta_abs is present. Signaling of further QP-delta within the same QG may be disabled.

Figure 6:
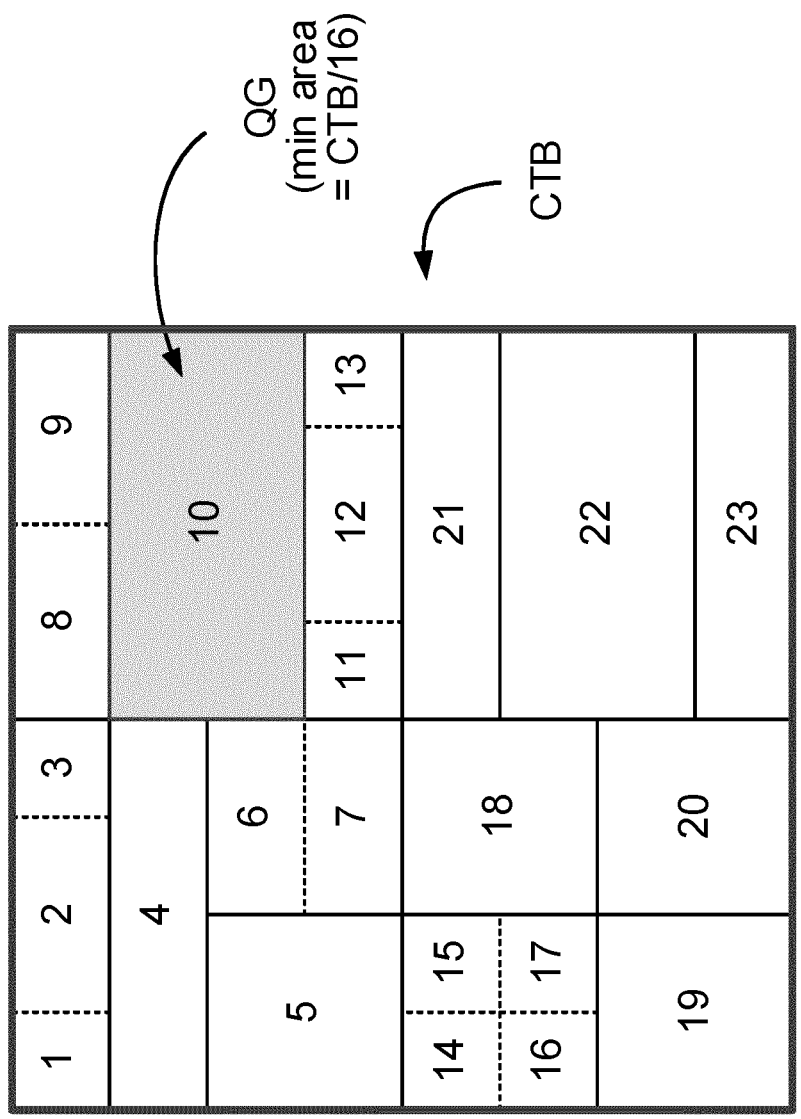
FIG. 6 illustrates an example of splitting a coding tree block (CTB) into quantization group (QGs) and/or CUs.

FIG. 6 illustrates an example of splitting a coding tree block, CTB, into QGs and/or CUs. In FIG. 6, the solid lines may indicate the QGs, and the dashed lines may indicate the units. Numbers may indicate a coding order (for example, a CU coding order). For example, a smaller number may precede a bigger number in the coding order. The QP of a unit (for example, a unit that precedes the current unit in a coding order) may be determined based on a QP predictor. The QP of a unit (for example, the current unit) may be adjusted based on a QP adjustment value. The QP of a unit (for example, a unit that follows the current unit in the coding order) may be obtained for example, based on the QP of the current unit. In FIG. 6, for example, the QP of leading CUs may be set equal to $qP_{Y\_PRED}$ (for example, when QP-delta is not signaled in the first CU of a QG in a coding order), and the QP of current and subsequent CUs may obtained (for example, as soon as a QP-delta is signaled) as in one or more examples herein.

Figure 7:
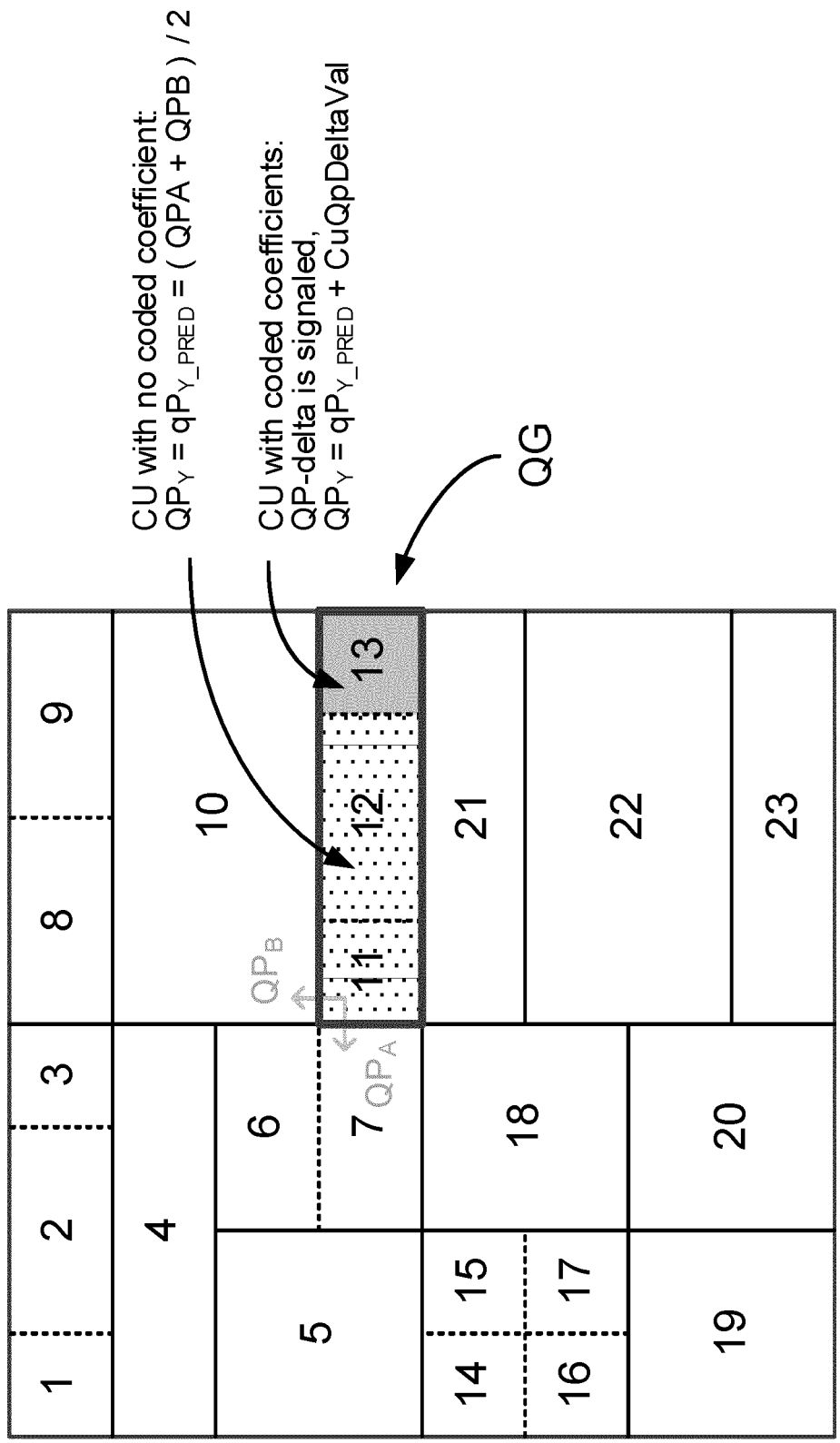
FIG. 7 illustrates an example of a QG with no QP-delta signaled in leading CUs.

FIG. 7 illustrates an example of a QG with no QP-delta signaled in leading CUs. The minimum area defining chroma quantization groups (for example, for chroma QP offsets) may be different from the minimum area defining luma quantization groups for luma QG offsets. Quantization group(s) may be defined based on an area. Numbers may indicate a coding order (for example, a CU coding order).

In examples, a QP adjustment value (for example, a QP-delta) may be applied at a CU level. A QP adjustment value may be signaled at a TU level (for example, via a transform_unit syntax structure as shown in Table 2). In examples, the current CU may be split into several transform units (TU). A QP adjustment value may not be signaled in the first TU (for example, when the current CU is split into the TUs), if the first TU does not carry coefficients (for example, cbf is zero). The parameter qPy (for example, as determined in examples herein) may still apply to the CU (for example, the whole CU). The QP (for example, the QP determined based on QP delta and QP predictor) may be back-propagated to the leading TUs of the current CU (for example, when a QP-delta is signaled in a TU that is not the first one, according to a certain order, of the CU).

Figure 8A:
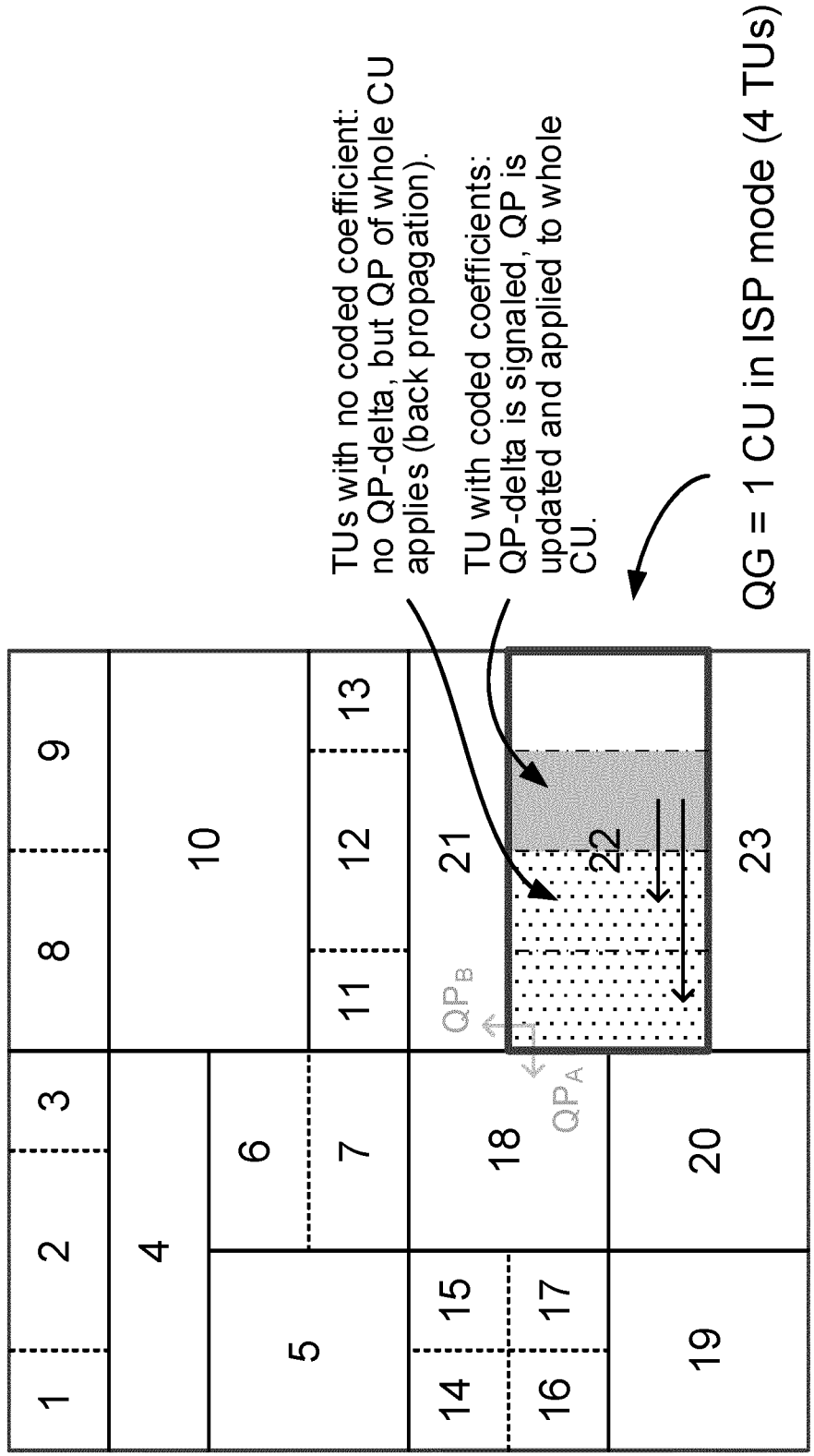
FIG. 8A illustrates an example of late QP-delta signaling in a CU (for example, a CU coded in intra subpartitions (ISP) mode with 4 TUs).

FIG. 8A illustrates an example of late QP-delta signaling, for example, in a CU coded in intra subpartitions (ISP) mode with 4 TUs. Numbers may indicate a coding order (for example, a CU coding order).

Late QP-delta signaling may occur (for example, when a CU is split into several TUs), for example, when the current CU is larger than the maximum transform size (for example, 128×128 CU), when the current CU is coded in sub block transform (SBT) mode (for example, the CU is split into two TUs, where only one TU can carry coefficients and the other TU does not carry coefficients), and/or when the current CU is coded in ISP mode (split in two or four TUs).

Figure 9A:
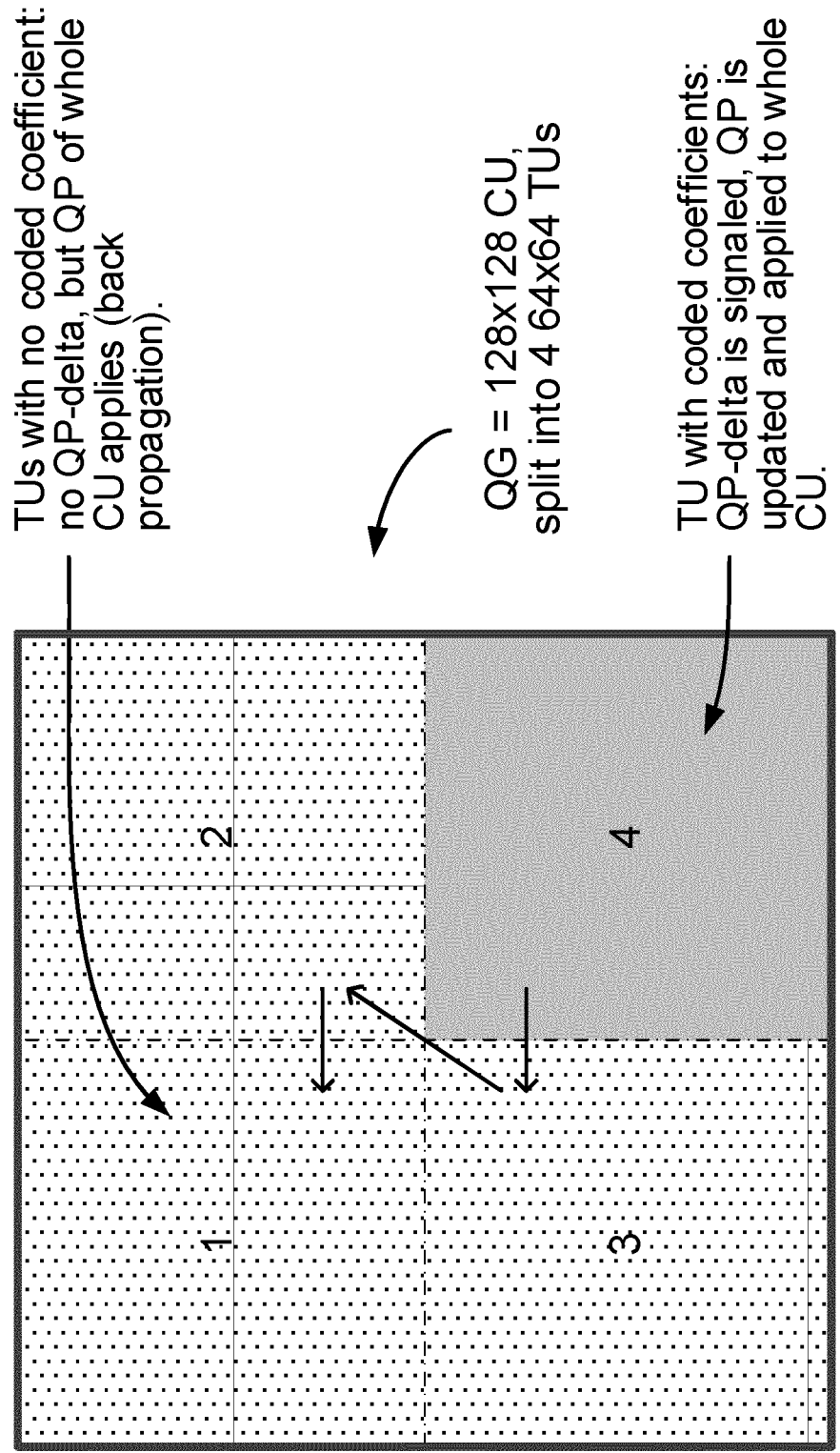
FIG. 9A illustrates an example of late QP-delta signaling in a CU with multiple (for example, 4) TUs.

Back-propagation may be prevented for CUs larger than 64 (for example, to limit the decoding pipeline to a reasonable size (VPDU concept)) as in Table 2, the example syntax excerpt from transform_unit. The QP-delta may be signaled (for example, for CUs larger than 64) in the first TU regardless of whether the first TU contains coded coefficients or not. Parallel processing of 64×64 areas may be accounted for. Parallel processing of CUs smaller than 64×64 areas may be treated differently. In some examples, QP may be defined at the CU level and signaled at the TU level. FIG. 9A illustrates an example of late QP-delta signaling in a CU with 4 TUs. The example in FIG. 9A illustrates late QP-delta signaling in a CU coded in ISP mode with 4 TUs. The example in FIG. 9A may be applicable to late QP-delta signaling in a CU coded in SBT mode with 4 TUs. Numbers may indicate a coding order (for example, a CU coding order). QG in FIG. 9A may include 4 64×64 TUs for a 128×128 CU.

QP adjustment values may be received at a syntax level (for example, received via a syntax element that is signaled at the syntax level or via a syntax element in a syntax structure associated with the syntax level). In examples, a QP adjustment value associated with (for example, assigned to) a syntax level may be defined and/or signaled at a syntax level and applied at the same syntax level. A QP adjustment value (for example, QP-delta) may be signaled at a TU level and assigned to the TU level (for example, the current TU). A QP adjustment value may be signaled at a CU level and assigned to the CU level (for example, the current CU).

Figure 8B:
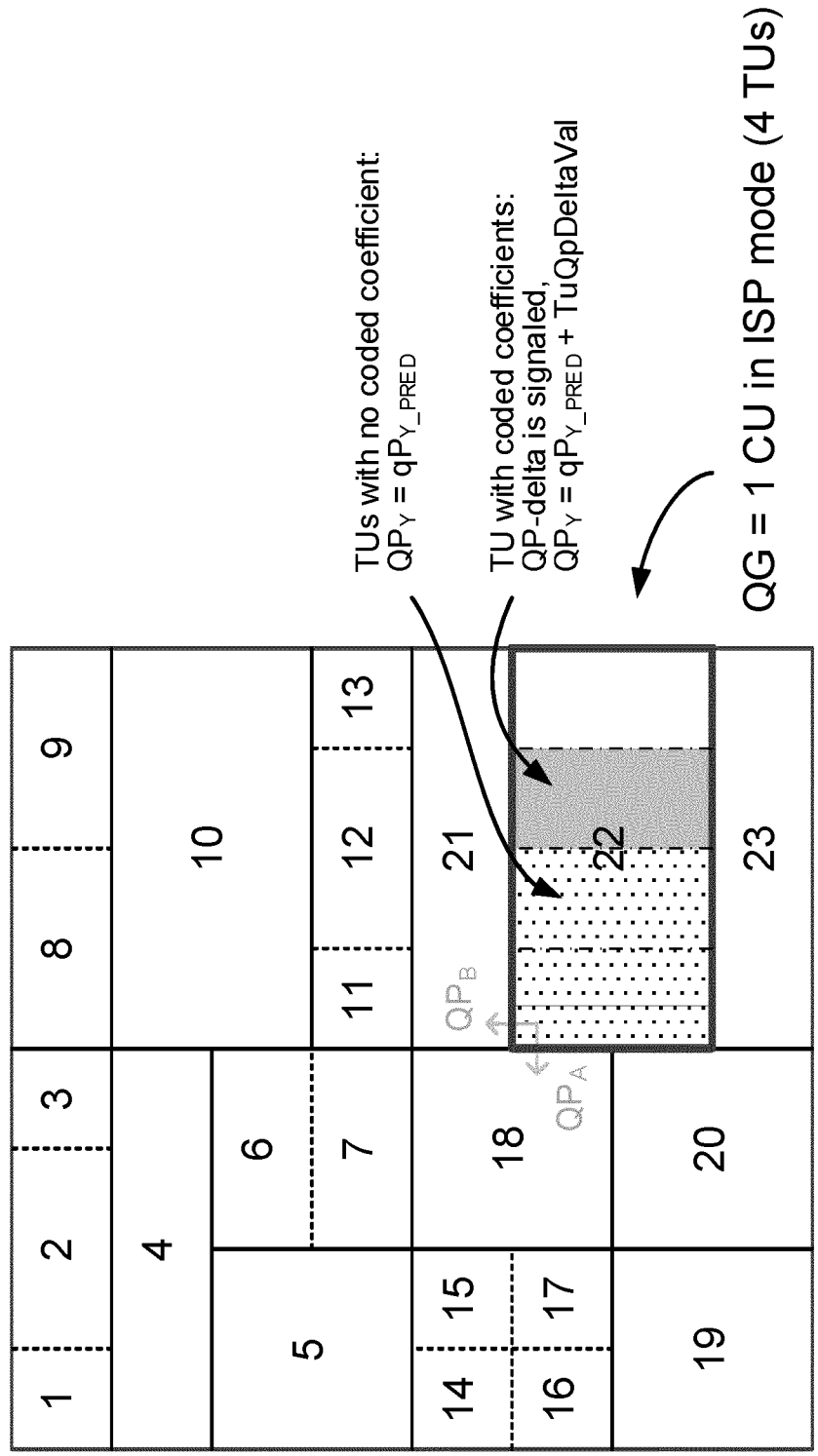
FIG. 8B illustrates an example of QP-delta signaling with no back propagation.

FIG. 8B illustrates an example of QP-delta signaling with no back propagation. Numbers may indicate a coding order (for example, a CU coding order). A QP adjustment value (for example, a QP-delta) may not be propagated to previous units (for example, previous TUs in a CU). A QP adjustment value may be associated with a syntax level (for example, a TU level). The QP adjustment value may be signaled at a syntax level (for example, a TU level). The QP adjustment value may be defined at the syntax level, for example, as the QP adjustment value associated with the syntax level. The QP adjustment value may be used at the syntax level, for example, applied to a QP associated with the syntax level to obtain an adjusted QP associated with the syntax level. The QP(s) of the preceding units (for example, TUs that precede the current TU in a coding order in the same CU) may be determined independent of the TU QP adjustment value received for the current TU. The QP(s) of the preceding units may be determined based on a QP predictor, for example, instead of the QP adjustment value (for example, the QP adjustment value associated with the syntax level). The QP predictor may be determined based on a QP of one or more adjacent units. The luma QP(s) of preceding units (for example, TUs) may be predicted based on the QP of the left and top unit of the top-left corner of the current QG. The chroma QP in dual-tree may be derived from the luma QP of the collocated luma unit (for example, TU). Deblocking filter may retrieve the QP of TUs (for example, to derive thresholds, filtering strength).

Figure 9B:
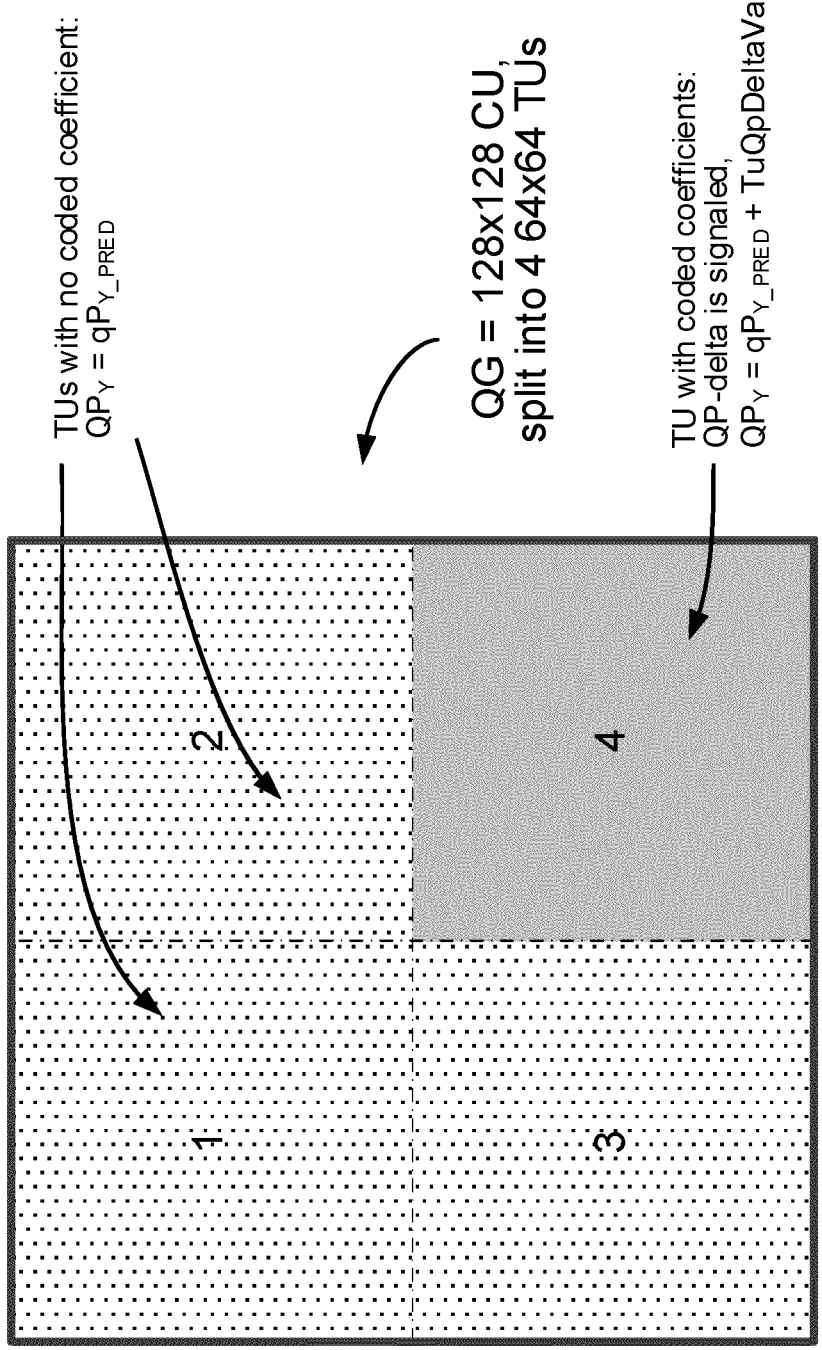
FIG. 9B illustrates an example of late QP-delta signaling with no back propagation.

FIG. 9B illustrates an example of late QP-delta signaling (for example, late QP-delta signaling in a CU) with no back propagation. Numbers may indicate a coding order (for example, a CU coding order). The example in FIG. 9B illustrates late QP-delta signaling in a CU coded in ISP mode with 4 TUs. The example in FIG. 9B may be applicable to late QP-delta signaling in a CU coded in SBT mode with 4 TUs. The example in FIG. 9B may be applicable to late QP-delta signaling in a CU (for example, the CU split into TUs when the CU size is greater than a max TU size such as 64×64 or 32×32). The QG in FIG. 9B may include 4 64×64 TUs for a 128×128 CU. As shown in FIG. 9B, TU 4 may include coded coefficients. As shown in FIG. 9B, a QP adjustment value may be signaled and/or specified for TU 4. As shown in FIG. 9B, an adjusted QP may be obtained based on a QP predictor and a QP adjustment value associated with a TU level (for example, TuQpDeltaVal).

Figure 14:
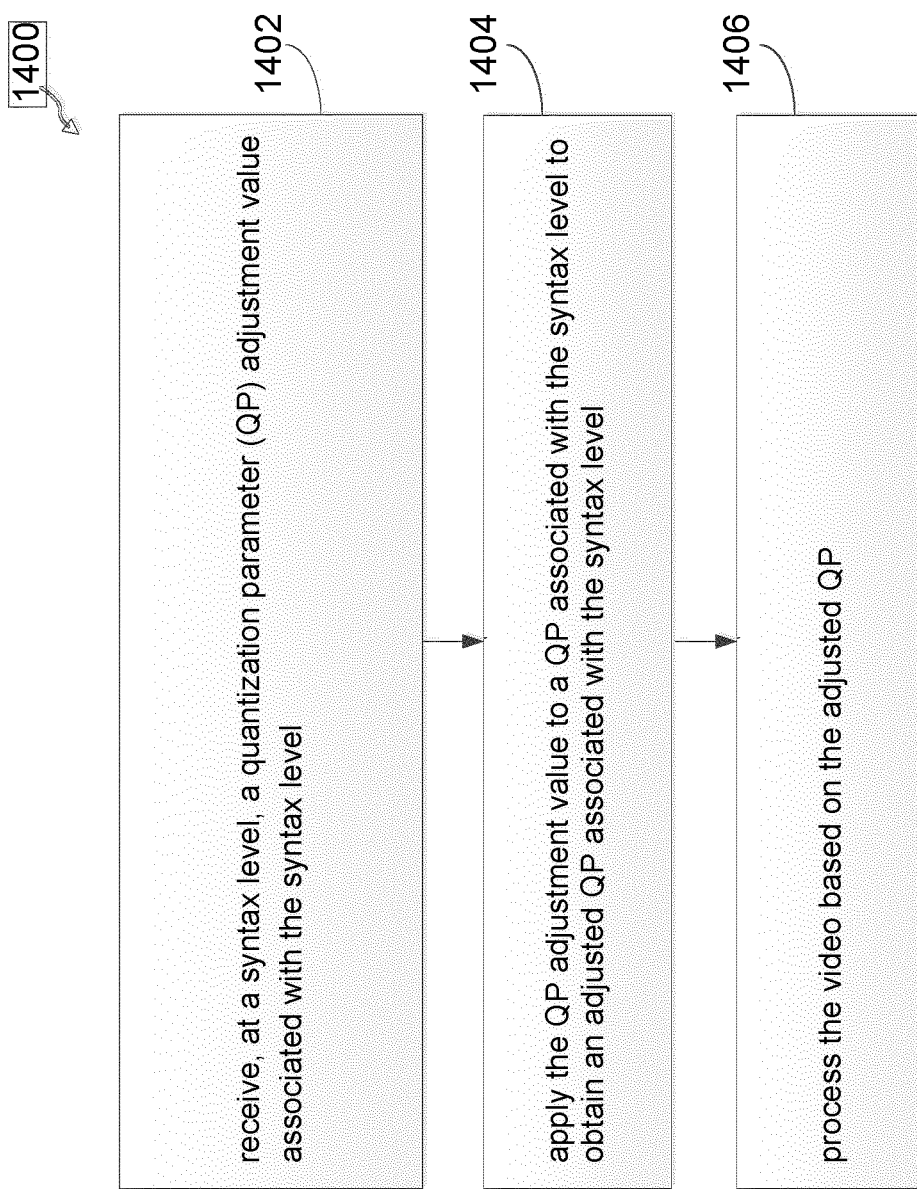
FIG. 14 illustrates an example of video processing based on a QP adjustment value.

FIG. 14 illustrates an example of a method for QP adjustment based on at least the examples shown in one or more of FIG. 8B, FIG. 9B, Table 5 and Table 6. Examples disclosed herein and other examples may operate in accordance with example method 1400. Method 1400 comprises 1402, 1404 and 1406. Method 1400 may be used to process a video. At 1402, a QP adjustment value associated with a syntax level may be received at the syntax level. At 1404, the QP adjustment value may be applied to a QP associated with the syntax level to obtain an adjusted QP associated with the syntax level. At 1406, the video may be processed based on the adjusted QP. Method 1400 may be performed by a decoder. When method 1400 is performed by a decoder, 1406 may entail decoding the video based on the adjusted QP. One or more of 1402, 1404 and 1406 may be performed by an encoder. For example, an encoder may obtain a QP adjustment value associated with a syntax level. The QP adjustment value may be applied to a QP associated with the syntax level to obtain an adjusted QP associated with the syntax level. The video may be processed (for example, encoded) based on the adjusted QP. The encoder may include the QP adjustment value applied to a syntax level at the same syntax level of a bitstream. For example, the encoder may include an indication of TU QP adjustment value at the TU level in the bitstream, as shown in Table 5. For example, the encoder may include an indication of CU QP adjustment value at the CU level in the bitstream, as shown in Table 6.

Method 1400 may be performed by an apparatus. The apparatus may include one or more processors. The operations related to the example illustrated in FIG. 14 may be shared by multiple processors or performed by one processor.

A QP adjustment value may be signaled or decoded based on a size of a unit, for example, to keep QP(s) constant on an aligned grid of samples. QP may be kept constant on an aligned grid of (for example, 4×4, 8×8, 16×16 or X×X) luma samples, by signaling the QP-delta, for example, immediately, when the TU size is smaller than a predetermined value in either direction. In examples, signaling the QP-delta immediately (for example, regardless of "coded block flags") whenever the TU size is smaller than a predetermined value (for example, 4, 8, 16, or X samples) in either direction may guarantee constant QP(s) on an aligned grid of samples. Constant QP(s) on an aligned grid of samples may minimize QP storage costs. QP may be kept (for example, guaranteed to be) constant when QP is defined at a TU level. An apparatus may determine whether a QP adjustment value indication is to be decoded based on the width, the height, or the size of a block (for example, the block that the QP adjustment value indication is for). For example, the decoder may determine whether to receive (for example, decode) a TU QP adjustment value indication (for example, based in part on a width and/or a height of the transform block associated with the TU). The decoder may determine to receive (for example, decode) for a coding tree, a TU QP adjustment value indication (for example, if the width and/or height of the coding block associated with the TU is less than a predetermined value). The decoder may determine whether to receive a TU QP adjustment value indication (for example, based in part on a size of the coding block associated with the TU). The decoder may determine to receive a TU QP adjustment value indication (for example, if the size of the coding block associated with the TU is less than a predetermined value).

Table 4 illustrates an example coding tree syntax.

In examples, an indication for a QP adjustment value associated with a TU level (for example, assigned to a TU level) may be signaled. A QP delta enablement indicator associated with a TU level (for example, tu_qp_delta_enabled_flag) equal to 1 may indicate or specify that the pic_tu_qp_delta_subdiv_intra_slice and pic_tu_qp_delta_subdiv_inter_slice syntax elements are present in picture headers (PHs) referring to the PPS and/or that syntax element tu_qp_delta_abs is present in the transform unit syntax. A QP delta enablement indicator associated with a TU level (for example, tu_qp_delta_enabled_flag) equal to 0 may indicate or specify that the pic_tu_qp_delta_subdiv_intra_slice and pic_tu_qp_delta_subdiv_inter_slice syntax elements are not present in PHs referring to the PPS and that syntax element tu_qp_delta_abs is not present in the transform unit syntax. Syntax element TuQpDeltaSubdiv may specify the maximum cbSubdiv value of the transform unit. Syntax element TuChromaQpOffsetSubdiv may specify the maximum cbSubdiv value of the transform unit. Syntax element IsTuChromaQpOffsetCoded may indicate whether the chroma QP offset is coded for the transform unit. A chroma offset enablement indicator associated with a TU level (for example, tu_chroma_qp_offset_enabled_flag) equal to 1 may indicate or specify that the indicator tu_chroma_qp_offset_flag is present in the transform unit and palette coding syntax. A chroma offset enablement indicator associated with a TU level (for example, tu_chroma_qp_offset_enabled_flag) equal to 0 may specify or indicate that the indicator tu_chroma_qp_offset_flag is not present in the transform unit and/or palette coding syntax. When not present, the value of the chroma offset enablement indicator associated with a TU level (for example, tu_chroma_qp_offset_enabled_flag) may be inferred to be equal to 0.

TABLE 4

| Example coding tree syntax | |
| --- | --- |
| | Descriptor |
| coding_tree( x0, y0, [...], qgOnY, qgOnC, cbSubdiv, [...] ) { | |
|   [...] | |
|   if( tu_qp_delta_enabled_flag && qgOnY && cbSubdiv <= TuQpDeltaSubdiv ) { | |
|     IsTuQpDeltaCoded = 0 | |
|     TuQpDeltaVal = 0 | |
|     QgTopLeftX = x0 | |
|     QgTopLeftY = y0 | |
|   } | |
|   if( tu_chroma_qp_offset_enabled_flag && qgOnC && | |
|     cbSubdiv <= TuChromaQpOffsetSubdiv ) | |
|     IsTuChromaQpOffsetCoded = 0 | |
|   [...] | |

TABLE 5

Example transform_unit syntax

| | Descriptor |
|---|---|
| transform_unit( x0, y0, tbWidth, tbHeight, treeType, subTuIndex, chType ) { | |
|   [...] | |
|   if( ( | |
|      tu_cbf_luma[ x0 ][ y0 ] \|\| ( chromaAvailable && ( tu_cbf_cb[ xC ][ yC ] \|\| | |
|      tu_cbf_cr[ xC ][ yC ] ) ) && treeType != DUAL_TREE_CHROMA ) { | |
|     if( tu_qp_delta_enabled_flag && !IsTuQpDeltaCoded ) { | |
|       tu_qp_delta_abs | ae(v) |
|       if( tu_qp_delta_abs ) | |
|         tu_qp_delta_sign_flag | ae(v) |
|     } | |
|   } | |
|   if( ( Min( tbWidth, tbHeight ) < 4 \|\| | |
|     ( chromaAvailable && ( tu_cbf_cb[ xC ][ yC ] \|\| tu_cbf_cr[ xC ][ yC ] ) ) ) && | |
|     treeType != DUAL_TREE_LUMA ) { | |
|     if( tu_chroma_qp_offset_enabled_flag && !IsTuChromaQpOffsetCoded) { | |
|       tu_chroma_qp_offset_flag | ae(v) |
|       if( tu_chroma_qp_offset_flag && chroma_qp_offset_list_len_minus1 > 0 ) | |
|         tu_chroma_qp_offset_idx | ae(v) |
|     } | |
|   } | |
| [...] | |

Table 5 illustrates an example of transform unit syntax (for example, a transform unit syntax structure). Syntax element IsTuQpDeltaCoded may indicate whether a QP adjustment value (for example, a QP delta) is coded for the TU. Syntax element tu_qp_delta_abs may indicate or specify the absolute value of the difference between the QP of the current transform unit and its prediction (for example, a QP adjustment value associated with a TU level as indicated by the variable TuQpDeltaVal). Syntax element tu_qp_delta_sign_flag may indicator or specify the sign of the QP adjustment value associated with the TU level (for example, the variable TuQpDeltaVal). Syntax element tu_chroma_qp_offset_idx, when present, may indicate or specify the index into one or more of the following chroma QP offset lists: the cb_qp_offset_list[ ], cr_qp_offset_list[ ], and joint_cbcr_qp_offset_list[ ] that may be used to determine the value of syntax elements TuQpOffsetCb, TuQpOffsetCr, and TuQpOffsetCbCr. When present, the value of syntax element tu_chroma_qp_offset_idx may be in the range of 0 to chroma_qp_offset_list_len_minus1, inclusive. When not present, the value of syntax element tu_chroma_qp_offset_idx may be inferred to be equal to 0. QPs may be obtained (for example, at the TU level) based on one or more examples as described herein.

When treeType is equal to SINGLE_TREE or DUAL_TREE_LUMA, the predicted luma QP (for example, QP predictor $qP_{Y\_PRED}$) may be obtained by the following ordered steps:

The variable $qP_{Y\_PREV}$ may be obtained (for example, derived) as follows:

If one or more of the following conditions are true, $qP_{Y\_PREV}$ may be set equal to a QP associated with a slice level (for example, $SliceQp_Y$):

The current quantization group is the first quantization group in a slice.

The current quantization group is the first quantization group in a tile.

The current quantization group is the first quantization group in a CTB row of a tile and entropy_coding_sync_enabled_flag is equal to 1.

Otherwise, $qP_{Y\_PREV}$ may be set equal to the luma QP ($Qp_Y$) of a luma TU (for example, the last luma TU) in the previous quantization group in a coding (for example, decoding) order.

A QP predictor may be determined based on one or more units (for example, TUs) adjacent to the current unit (for example, using the QP(s) associated with adjacent unit(s)). Examples may refer to "neighbor," which may include different types of neighbors, for example, spatial neighbors in different directions, temporal neighbors, or neighbors according to a certain order (for example, a decoding order, an encoding order, an output order, a displaying order, and/or the like). The neighbors may include one or more of blocks, sub-blocks, TUs, CUs, QGs and/or PUs that are adjacent to each other. The neighbors may be contiguous or noncontiguous. Examples may refer to "adjacency," which may include different types of adjacency, for example, spatial adjacency in different directions, temporal adjacency, or adjacency according to a certain order (for example, a decoding order, an encoding order, an output order, a displaying order, and/or the like). The derivation process for neighboring block availability may be invoked. As shown in FIG. 8B, $qP_{Y\_A}$ may be for an adjacent coding block 18, and $qP_{Y\_B}$ may be for an adjacent coding block 21. The variable $qP_{Y\_A}$ may be derived as follows:

If one or more of the following conditions are true, $qP_{Y\_A}$ may be set equal to $qP_{Y\_PREV}$: available A is equal to FALSE.

The CTB containing the luma coding block covering the luma location (xQg−1, yQg) is not equal to the CTB containing the current luma coding block at (xCb, yCb), for example, all of the following conditions are true:

(xQg−1)>>Ctb Log 2SizeY is not equal to (xCb)>>Ctb Log 2SizeY (yQg)>>Ctb Log 2SizeY is not equal to (yCb)>>Ctb Log 2SizeY Otherwise, $qP_{Y\_A}$ may be set equal to the luma QP QpY of the transform unit covering (xQg−1, yQg). $gP_{Y\_B}$ may be set in a similar manner to $qP_{Y\_A}$.

The luma location (xQg, yQg) may indicate or specify the top-left luma sample of the current quantization group relative to the top left luma sample of the current picture. The horizontal and vertical positions xQg and yQg may be set equal to CuQgTopLeftX and CuQgTopLeftY, respectively.

When ChromaArrayType is not equal to 0 and treeType is equal to SINGLE_TREE or DUAL_TREE_CHROMA, the following may apply:

When treeType is equal to DUAL_TREE_CHROMA, the variable $Qp_Y$ may be set equal to the luma QP $Qp_Y$ of the luma transform unit that covers the luma location (xCb+cbWidth/2, yCb+cbHeight/2).

Deblocking filter process may be performed, for example, using QP(s) for respective TU(s). Edge filtering process for a direction may occur. Decision process for luma block edges may occur. The variables $Qp_Q$ and $Qp_P$ may be set equal to the $Qp_Y$ values of the transform units (for example, which may include the coding blocks containing the sample $q_{0,0}$ and $p_{0,0}$, respectively).

A QP adjustment value (for example, a QP-delta) may be signaled at a coding block level or CU level and may be defined (for example, used) at a CU level. Although certain examples may be described in terms of coding units, the examples may be equally applicable to coding blocks. Thus, in a sense these terms may be interchangeably used, and examples described in terms of coding units may be equally applicable to coding blocks.

A QP adjustment value (for example, a QP-delta) may be signaled at a syntax level (for example, in a syntax structure associated with the syntax level). For example, a QP adjustment value may be signaled at a CU level (for example, in a coding_unit syntax structure), as shown in Table 6. A QP adjustment value may be specified for a first TU in a coding order. A QP adjustment value may be signaled at a CU level, for example, conditioned by "cu_cbf". cu_cbf may be reworked or complemented by other flags (for example, so that relevant conditions can be derived for the transmission of luma QP-delta and/or chroma adjustment). Table 6 illustrates an example of coding_unit syntax (for example, a coding unit syntax structure). QP-delta may be signaled/received in the coding_unit syntax, as illustrated in Table 6.

cu_cbf may be used (for example, in the DUAL_TREE_CHROMA type). The value of last tu_cbf may be inferred to be 1 (for example, in the intra ISP case and/or if all first tu_cbf are false and cu_cbf is true).

Figure 10A:
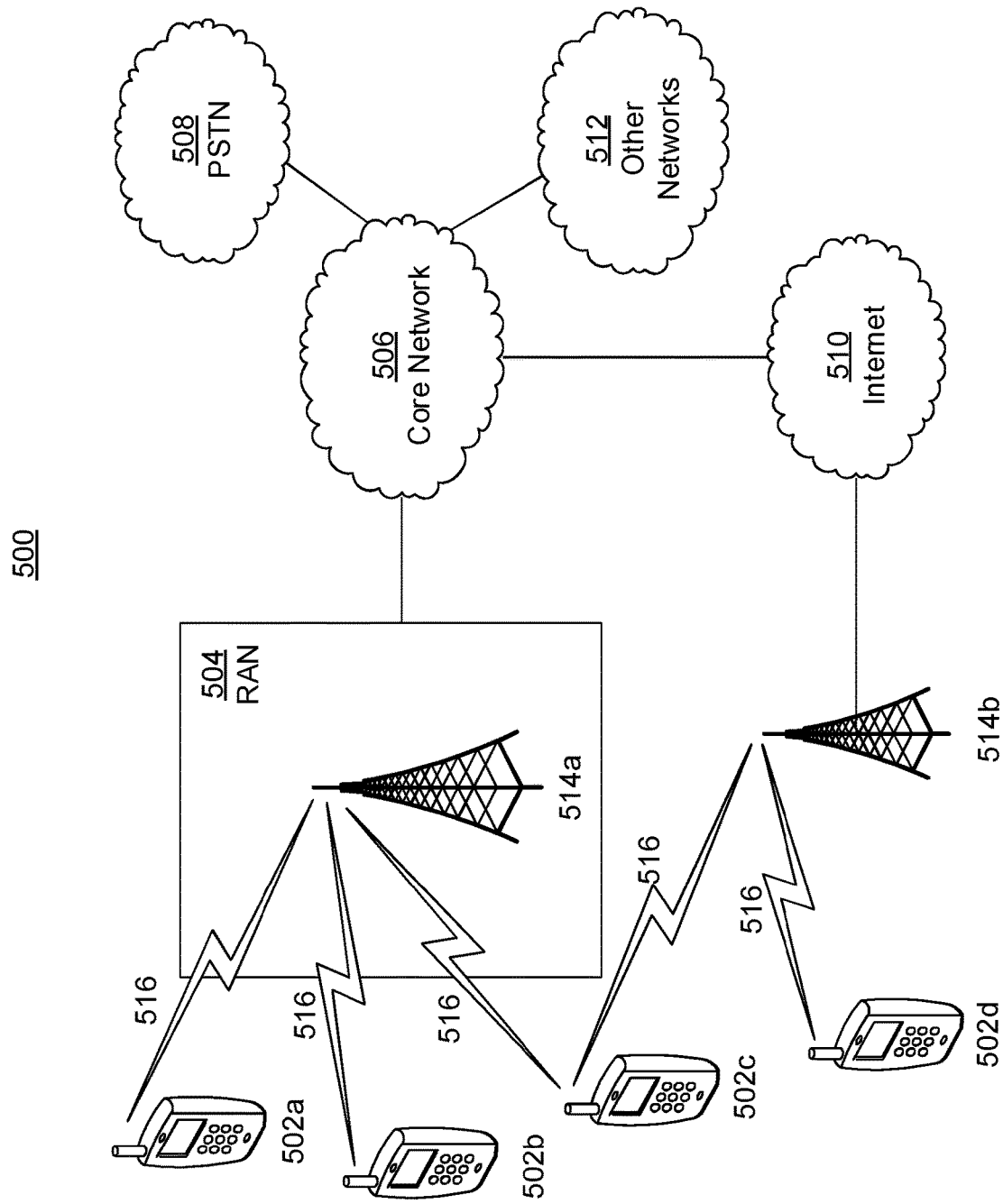
FIG. 10A is a system diagram illustrating an example communications system in which one or more disclosed embodiments may be implemented.

FIG. 10A is a diagram illustrating an example communications system 500 in which one or more disclosed embodiments may be implemented. The communications system 500 may be a multiple access system that provides content, such as voice, data, video, messaging, broadcast, etc., to multiple wireless users. The communications system 500 may enable multiple wireless users to access such content through the sharing of system resources, including wireless bandwidth. For example, the communications systems 500 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 10A, the communications system 500 may include wireless transmit/receive units (WTRUs) 502a, 502b, 502c, 502d, a RAN 504/513, a CN 506/515, a public switched telephone network (PSTN) 508, the Internet 510, and other networks 512, though it will be appreciated that the disclosed embodiments contemplate any number of WTRUs, base stations, networks, and/or network elements. Each of the WTRUs 502a, 502b, 502c, 502d may be any type of device configured to operate and/or communicate in a wireless environment. By way of example, the WTRUs 502a, 502b, 502c, 502d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular

TABLE 6 example coding_unit syntax

| | Descriptor |
|---|---|
| coding_unit( x0, y0, cbWidth, cbHeight, cqtDepth, treeType, modeType ) { | |
| [...] | |
|   if( CuPredMode[ chType ][ x0 ][ y0 ] != MODE_INTRA && !pred_mode_plt_flag && | |
|     general_merge_flag[ x0 ][ y0 ] = = 0 ) | |
|     cu_cbf | ae(v) |
|   if( cu_cbf ) { | |
|     if( cu_qp_delta_enabled_flag && !IsCuQpDeltaCoded ) { | |
|       cu_qp_delta_abs | |
|       if( cu_qp_delta_abs ) | |
|         cu_qp_delta_sign_flag | |
|     } | |
|     if( cu_chroma_qp_offset_enabled_flag && !IsCuChromaQpOffsetCoded) { | |
|       cu_chroma_qp_offset_flag | |
|       if( cu_chroma_qp_offset_flag && chroma_qp_offset_list_len_minus1 > 0 ) | |
|         cu_chroma_qp_offset_idx | |
|     } | |
|   } | |
| } | |

Signaling cost may be reduced by inferring some flags based on the added cu-level data. In DUAL_TREE_LUMA intra mode, tu_cbf_luma may be inferred (for example, based on cu_cbf flag). In the SINGLE_TREE type, tu_cbf_luma may be inferred to be 1 (for example, if tu_cbf_cb and tu_cbf_cr are false when cu_cbf is true). This may be similar to inter prediction. The value of tu_cbf_luma may be inferred to be 1 in the SINGLE_TREE type (for example, when cu_qp_delta_abs is not nul). Parameter telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 502a, 502b, 502c and 502d may be interchangeably referred to as a UE.

The communications systems 500 may also include a base station 514a and/or a base station 514b. Each of the base stations 514a, 514b may be any type of device configured to wirelessly interface with at least one of the WTRUs 502a, 502b, 502c, 502d to facilitate access to one or more communication networks, such as the CN 506/515, the Internet 510, and/or the other networks 512. By way of example, the base stations 514a, 514b may be a base transceiver station (BTS), a Node-B, an eNode B, a Home Node B, a Home eNode B, a gNB, a NR NodeB, a site controller, an access point (AP), a wireless router, and the like. While the base stations 514a, 514b are each depicted as a single element, it will be appreciated that the base stations 514a, 514b may include any number of interconnected base stations and/or network elements.

The base station 514a may be part of the RAN 504/513, which may also include other base stations and/or network elements (not shown), such as a base station controller (BSC), a radio network controller (RNC), relay nodes, etc. The base station 514a and/or the base station 514b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 514a may be divided into three sectors. Thus, in one embodiment, the base station 514a may include three transceivers, i.e., one for each sector of the cell. In an embodiment, the base station 514a may employ multiple-input multiple output (MIMO) technology and may utilize multiple transceivers for each sector of the cell. For example, beamforming may be used to transmit and/or receive signals in desired spatial directions.

The base stations 514a, 514b may communicate with one or more of the WTRUs 502a, 502b, 502c, 502d over an air interface 516, which may be any suitable wireless communication link (e.g., radio frequency (RF), microwave, centimeter wave, micrometer wave, infrared (IR), ultraviolet (UV), visible light, etc.). The air interface 516 may be established using any suitable radio access technology (RAT).

More specifically, as noted above, the communications system 500 may be a multiple access system and may employ one or more channel access schemes, such as CDMA, TDMA, FDMA, OFDMA, SC-FDMA, and the like. For example, the base station 514a in the RAN 504/513 and the WTRUs 502a, 502b, 502c may implement a radio technology such as Universal Mobile Telecommunications System (UMTS) Terrestrial Radio Access (UTRA), which may establish the air interface 515/516/517 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 514a and the WTRUs 502a, 502b, 502c may implement a radio technology such as Evolved UMTS Terrestrial Radio Access (E-UTRA), which may establish the air interface 516 using Long Term Evolution (LTE) and/or LTE-Advanced (LTE-A) and/or LTE-Advanced Pro (LTE-A Pro).

In an embodiment, the base station 514a and the WTRUs 502a, 502b, 502c may implement a radio technology such as NR Radio Access, which may establish the air interface 516 using New Radio (NR).

In an embodiment, the base station 514a and the WTRUs 502a, 502b, 502c may implement multiple radio access technologies. For example, the base station 514a and the WTRUs 502a, 502b, 502c may implement LTE radio access and NR radio access together, for instance using dual connectivity (DC) principles. Thus, the air interface utilized by WTRUs 502a, 502b, 502c may be characterized by multiple types of radio access technologies and/or transmissions sent to/from multiple types of base stations (e.g., a eNB and a gNB).

In other embodiments, the base station 514a and the WTRUs 502a, 502b, 502c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 514b in FIG. 10A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 514b and the WTRUs 502c, 502d may implement a radio technology such as IEEE 802.11 to establish a wireless local area network (WLAN). In an embodiment, the base station 514b and the WTRUs 502c, 502d may implement a radio technology such as IEEE 802.15 to establish a wireless personal area network (WPAN). In yet another embodiment, the base station 514b and the WTRUs 502c, 502d may utilize a cellular-based RAT (e.g., WCDMA, CDMA2000, GSM, LTE, LTE-A, LTE-A Pro, NR etc.) to establish a picocell or femtocell. As shown in FIG. 10A, the base station 514b may have a direct connection to the Internet 510. Thus, the base station 514b may not be required to access the Internet 510 via the CN 506/515.

The RAN 504/513 may be in communication with the CN 506/515, which may be any type of network configured to provide voice, data, applications, and/or voice over internet protocol (VoIP) services to one or more of the WTRUs 502a, 502b, 502c, 502d. The data may have varying quality of service (QoS) requirements, such as differing throughput requirements, latency requirements, error tolerance requirements, reliability requirements, data throughput requirements, mobility requirements, and the like. The CN 506/515 may provide call control, billing services, mobile location-based services, pre-paid calling, Internet connectivity, video distribution, etc., and/or perform high-level security functions, such as user authentication. Although not shown in FIG. 10A, it will be appreciated that the RAN 504/513 and/or the CN 506/515 may be in direct or indirect communication with other RANs that employ the same RAT as the RAN 504/513 or a different RAT. For example, in addition to being connected to the RAN 504/513, which may be utilizing a NR radio technology, the CN 506/515 may also be in communication with another RAN (not shown) employing a GSM, UMTS, CDMA 2000, WiMAX, E-UTRA, or WiFi radio technology.

The CN 506/515 may also serve as a gateway for the WTRUs 502a, 502b, 502c, 502d to access the PSTN 508, the Internet 510, and/or the other networks 512. The PSTN 508 may include circuit-switched telephone networks that provide plain old telephone service (POTS). The Internet 510 may include a global system of interconnected computer networks and devices that use common communication protocols, such as the transmission control protocol (TCP), user datagram protocol (UDP) and/or the internet protocol (IP) in the TCP/IP internet protocol suite. The networks 512 may include wired and/or wireless communications networks owned and/or operated by other service providers. For example, the networks 512 may include another CN connected to one or more RANs, which may employ the same RAT as the RAN 504/513 or a different RAT.

Some or all of the WTRUs 502a, 502b, 502c, 502d in the communications system 500 may include multi-mode capabilities (e.g., the WTRUs 502a, 502b, 502c, 502d may include multiple transceivers for communicating with different wireless networks over different wireless links). For example, the WTRU 502c shown in FIG. 10A may be configured to communicate with the base station 514a, which may employ a cellular-based radio technology, and with the base station 514b, which may employ an IEEE 802 radio technology.

Figure 10B:
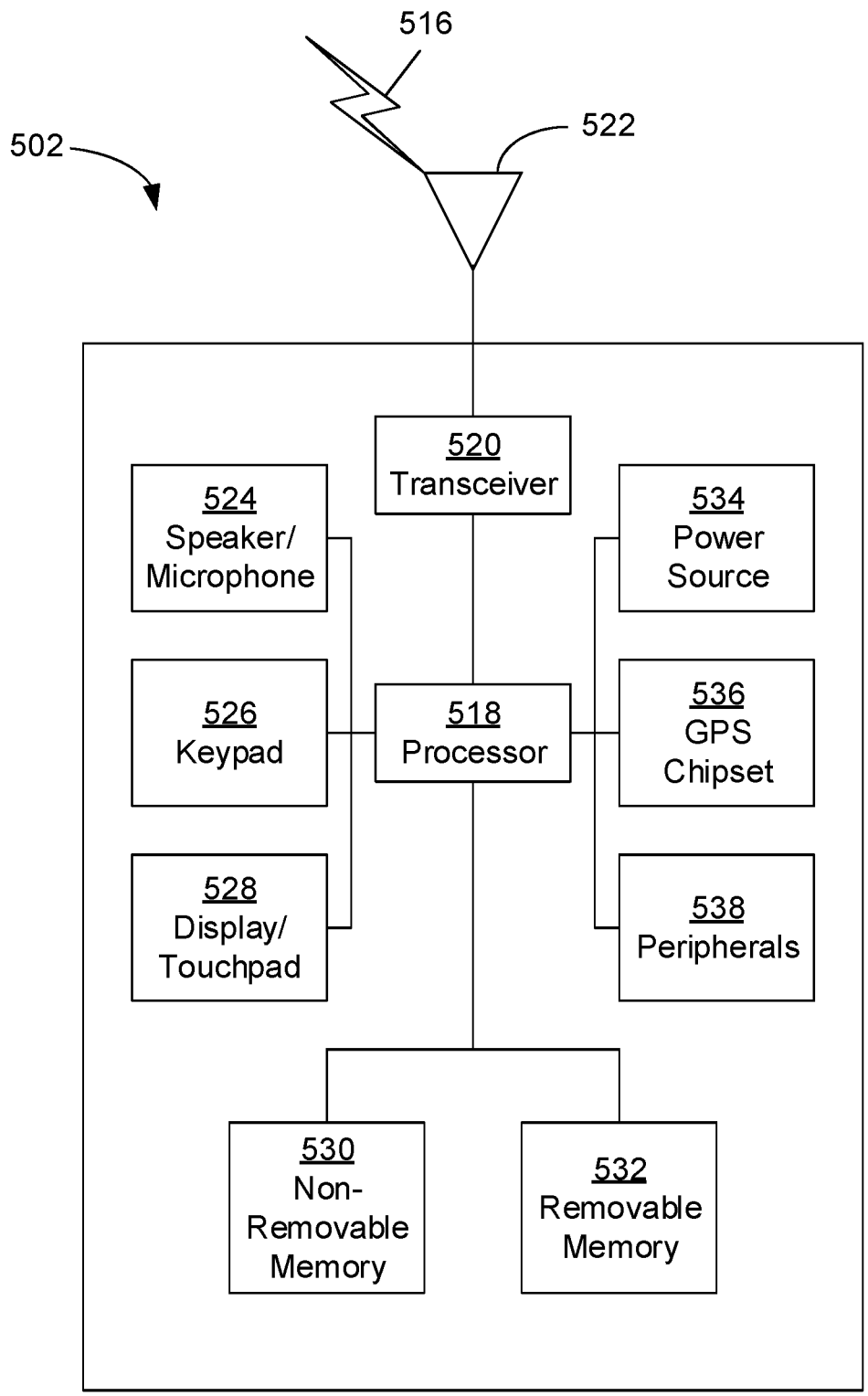
FIG. 10B is a system diagram illustrating an example wireless transmit/receive unit (WTRU) that may be used within the communications system illustrated in FIG. 10A according to an embodiment.

FIG. 10B is a system diagram illustrating an example WTRU 502. As shown in FIG. 10B, the WTRU 502 may include a processor 518, a transceiver 520, a transmit/receive element 522, a speaker/microphone 524, a keypad 526, a display/touchpad 528, non-removable memory 530, removable memory 532, a power source 534, a global positioning system (GPS) chipset 536, and/or other peripherals 538, among others. It will be appreciated that the WTRU 502 may include any sub-combination of the foregoing elements while remaining consistent with an embodiment.

The processor 518 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 518 may perform signal coding, data processing, power control, input/output processing, and/or any other functionality that enables the WTRU 502 to operate in a wireless environment. The processor 518 may be coupled to the transceiver 520, which may be coupled to the transmit/receive element 522. While FIG. 10B depicts the processor 518 and the transceiver 520 as separate components, it will be appreciated that the processor 518 and the transceiver 520 may be integrated together in an electronic package or chip.

The transmit/receive element 522 may be configured to transmit signals to, or receive signals from, a base station (e.g., the base station 514a) over the air interface 516. For example, in one embodiment, the transmit/receive element 522 may be an antenna configured to transmit and/or receive RF signals. In an embodiment, the transmit/receive element 522 may be an emitter/detector configured to transmit and/or receive IR, UV, or visible light signals, for example. In yet another embodiment, the transmit/receive element 522 may be configured to transmit and/or receive both RF and light signals. It will be appreciated that the transmit/receive element 522 may be configured to transmit and/or receive any combination of wireless signals.

Although the transmit/receive element 522 is depicted in FIG. 10B as a single element, the WTRU 502 may include any number of transmit/receive elements 522. More specifically, the WTRU 502 may employ MIMO technology. Thus, in one embodiment, the WTRU 502 may include two or more transmit/receive elements 522 (e.g., multiple antennas) for transmitting and receiving wireless signals over the air interface 516.

The transceiver 520 may be configured to modulate the signals that are to be transmitted by the transmit/receive element 522 and to demodulate the signals that are received by the transmit/receive element 522. As noted above, the WTRU 502 may have multi-mode capabilities. Thus, the transceiver 520 may include multiple transceivers for enabling the WTRU 502 to communicate via multiple RATs, such as NR and IEEE 802.11, for example.

The processor 518 of the WTRU 502 may be coupled to, and may receive user input data from, the speaker/microphone 524, the keypad 526, and/or the display/touchpad 528 (e.g., a liquid crystal display (LCD) display unit or organic light-emitting diode (OLED) display unit). The processor 518 may also output user data to the speaker/microphone 524, the keypad 526, and/or the display/touchpad 528. In addition, the processor 518 may access information from, and store data in, any type of suitable memory, such as the non-removable memory 530 and/or the removable memory 532. The non-removable memory 530 may include random-access memory (RAM), read-only memory (ROM), a hard disk, or any other type of memory storage device. The removable memory 532 may include a subscriber identity module (SIM) card, a memory stick, a secure digital (SD) memory card, and the like. In other embodiments, the processor 518 may access information from, and store data in, memory that is not physically located on the WTRU 502, such as on a server or a home computer (not shown).

The processor 518 may receive power from the power source 534, and may be configured to distribute and/or control the power to the other components in the WTRU 502. The power source 534 may be any suitable device for powering the WTRU 502. For example, the power source 534 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 518 may also be coupled to the GPS chipset 536, which may be configured to provide location information (e.g., longitude and latitude) regarding the current location of the WTRU 502. In addition to, or in lieu of, the information from the GPS chipset 536, the WTRU 502 may receive location information over the air interface 516 from a base station (e.g., base stations 514a, 514b) and/or determine its location based on the timing of the signals being received from two or more nearby base stations. It will be appreciated that the WTRU 502 may acquire location information by way of any suitable location-determination method while remaining consistent with an embodiment.

The processor 518 may further be coupled to other peripherals 538, which may include one or more software and/or hardware modules that provide additional features, functionality and/or wired or wireless connectivity. For example, the peripherals 538 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 538 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 502 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 518). In an embodiment, the WRTU 502 may include a half-duplex radio for which transmission and reception of some or all of the signals (e.g., associated with particular subframes for either the UL (e.g., for transmission) or the downlink (e.g., for reception)).

Figure 10C:
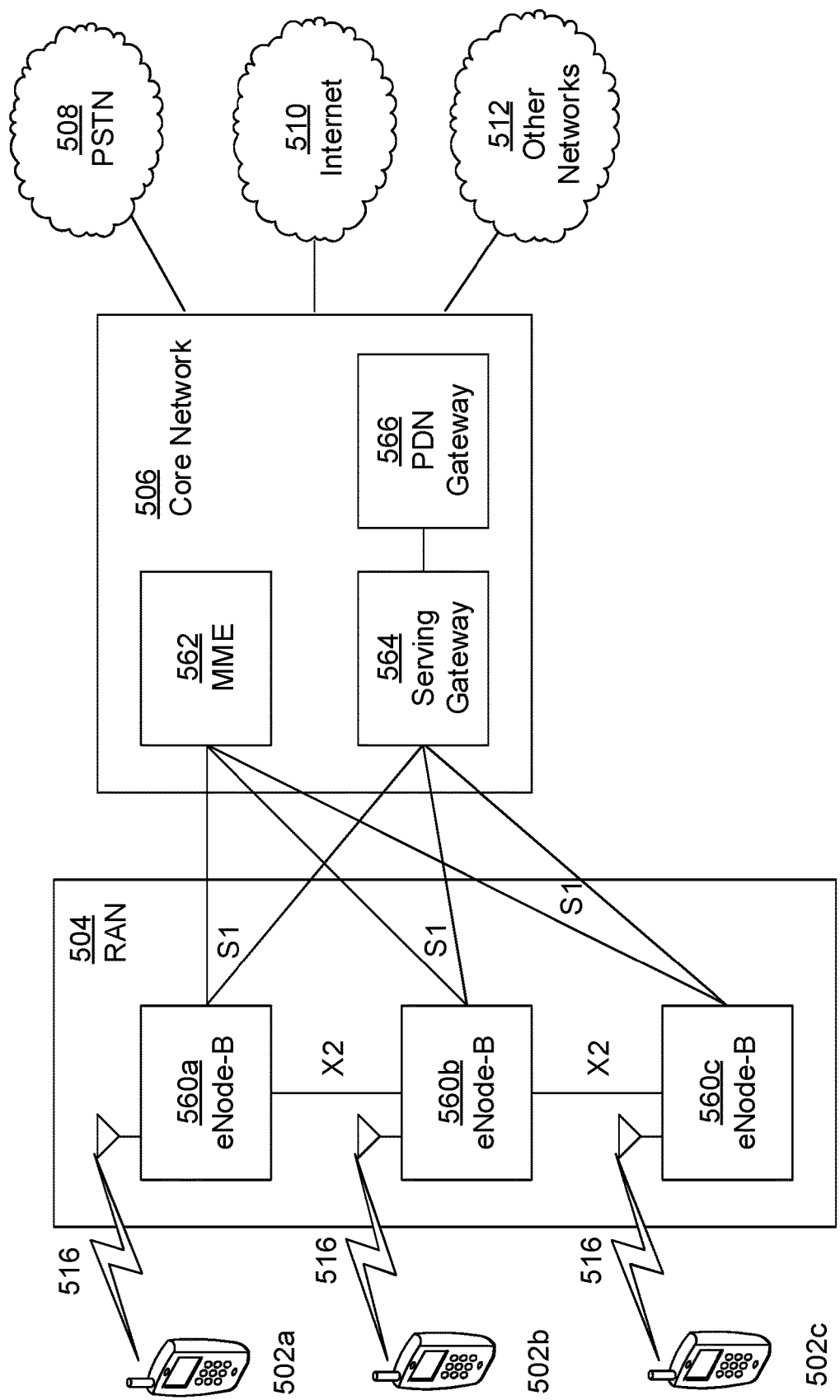
FIG. 10C is a system diagram illustrating an example radio access network (RAN) and an example core network (CN) that may be used within the communications system illustrated in FIG. 10A according to an embodiment.

FIG. 10C is a system diagram illustrating the RAN 504 and the CN 506 according to an embodiment. As noted above, the RAN 504 may employ an E-UTRA radio technology to communicate with the WTRUs 502*a*, 502*b*, 502*c* over the air interface 516. The RAN 504 may also be in communication with the CN 506.

The RAN 504 may include eNode-Bs 560*a*, 560*b*, 560*c*, though it will be appreciated that the RAN 504 may include any number of eNode-Bs while remaining consistent with an embodiment. The eNode-Bs 560*a*, 560*b*, 560*c* may each include one or more transceivers for communicating with the WTRUs 502*a*, 502*b*, 502*c* over the air interface 516. In one embodiment, the eNode-Bs 560*a*, 560*b*, 560*c* may implement MIMO technology. Thus, the eNode-B 560*a*, for example, may use multiple antennas to transmit wireless signals to, and/or receive wireless signals from, the WTRU 502*a*.

Each of the eNode-Bs 560*a*, 560*b*, 560*c* may be associated with a particular cell (not shown) and may be configured to handle radio resource management decisions, handover decisions, scheduling of users in the UL and/or DL, and the like. As shown in FIG. 10C, the eNode-Bs 560*a*, 560*b*, 560*c* may communicate with one another over an X2 interface.

The CN 506 shown in FIG. 10C may include a mobility management entity (MME) 562, a serving gateway (SGW) 564, and a packet data network (PDN) gateway (or PGW) 566. While each of the foregoing elements are depicted as part of the CN 506, it will be appreciated that any of these elements may be owned and/or operated by an entity other than the CN operator.

The MME 562 may be connected to each of the eNode-Bs 562*a*, 562*b*, 562*c* in the RAN 504 via an S1 interface and may serve as a control node. For example, the MME 562 may be responsible for authenticating users of the WTRUs 502*a*, 502*b*, 502*c*, bearer activation/deactivation, selecting a particular serving gateway during an initial attach of the WTRUs 502*a*, 502*b*, 502*c*, and the like. The MME 562 may provide a control plane function for switching between the RAN 504 and other RANs (not shown) that employ other radio technologies, such as GSM and/or WCDMA.

The SGW 564 may be connected to each of the eNode Bs 560*a*, 560*b*, 560*c* in the RAN 504 via the S1 interface. The SGW 564 may generally route and forward user data packets to/from the WTRUs 502*a*, 502*b*, 502*c*. The SGW 564 may perform other functions, such as anchoring user planes during inter-eNode B handovers, triggering paging when DL data is available for the WTRUs 502*a*, 502*b*, 502*c*, managing and storing contexts of the WTRUs 502*a*, 502*b*, 502*c*, and the like.

The SGW 564 may be connected to the PGW 566, which may provide the WTRUs 502*a*, 502*b*, 502*c* with access to packet-switched networks, such as the Internet 510, to facilitate communications between the WTRUs 502*a*, 502*b*, 502*c* and IP-enabled devices.

The CN 506 may facilitate communications with other networks. For example, the CN 506 may provide the WTRUs 502*a*, 502*b*, 502*c* with access to circuit-switched networks, such as the PSTN 508, to facilitate communications between the WTRUs 502*a*, 502*b*, 502*c* and traditional land-line communications devices. For example, the CN 506 may include, or may communicate with, an IP gateway (e.g., an IP multimedia subsystem (IMS) server) that serves as an interface between the CN 506 and the PSTN 508. In addition, the CN 506 may provide the WTRUs 502*a*, 502*b*, 502*c* with access to the other networks 512, which may include other wired and/or wireless networks that are owned and/or operated by other service providers.

Although the WTRU is described in FIGS. 10A-10D as a wireless terminal, it is contemplated that in certain representative embodiments that such a terminal may use (e.g., temporarily or permanently) wired communication interfaces with the communication network.

In representative embodiments, the other network 512 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 10D:
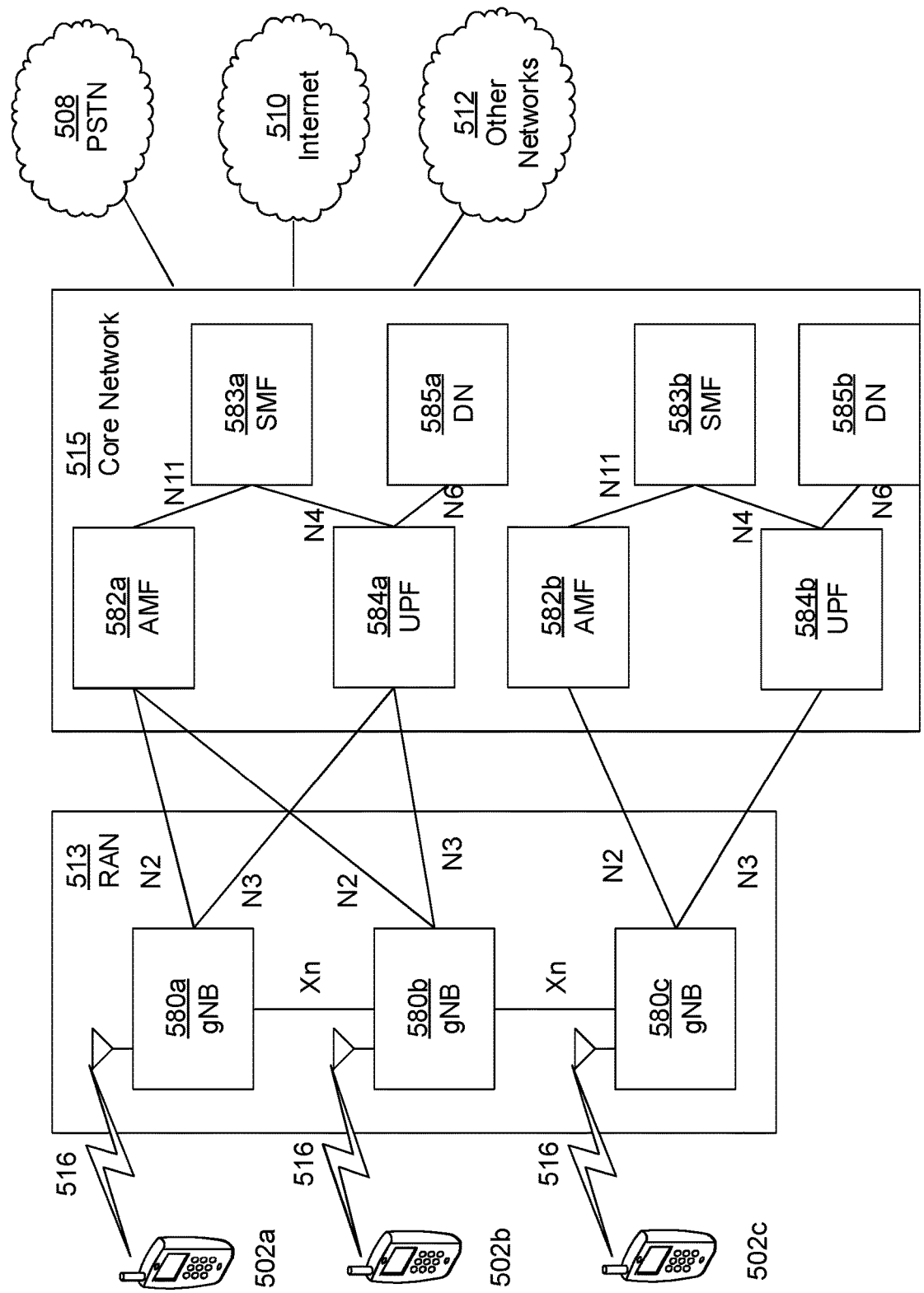
FIG. 10D is a system diagram illustrating a further example RAN and a further example CN that may be used within the communications system illustrated in FIG. 10A according to an embodiment.

FIG. 10D is a system diagram illustrating the RAN 513 and the CN 515 according to an embodiment. As noted above, the RAN 513 may employ an NR radio technology to communicate with the WTRUs 502a, 502b, 502c over the air interface 516. The RAN 513 may also be in communication with the CN 515.

The RAN 513 may include gNBs 580a, 580b, 580c, though it will be appreciated that the RAN 513 may include any number of gNBs while remaining consistent with an embodiment. The gNBs 580a, 580b, 580c may each include one or more transceivers for communicating with the WTRUs 502a, 502b, 502c over the air interface 516. In one embodiment, the gNBs 580a, 580b, 580c may implement MIMO technology. For example, gNBs 580a, 508b may utilize beamforming to transmit signals to and/or receive signals from the gNBs 580a, 580b, 580c. Thus, the gNB 580a, for example, may use multiple antennas to transmit wireless signals to, and/or receive wireless signals from, the WTRU 502a. In an embodiment, the gNBs 580a, 580b, 580c may implement carrier aggregation technology. For example, the gNB 580a may transmit multiple component carriers to the WTRU 502a (not shown). A subset of these component carriers may be on unlicensed spectrum while the remaining component carriers may be on licensed spectrum. In an embodiment, the gNBs 580a, 580b, 580c may implement Coordinated Multi-Point (CoMP) technology. For example, WTRU 502a may receive coordinated transmissions from gNB 580a and gNB 580b (and/or gNB 580c).

The WTRUs 502a, 502b, 502c may communicate with gNBs 580a, 580b, 580c using transmissions associated with a scalable numerology. For example, the OFDM symbol spacing and/or OFDM subcarrier spacing may vary for different transmissions, different cells, and/or different portions of the wireless transmission spectrum. The WTRUs 502a, 502b, 502c may communicate with gNBs 580a, 580b, 580c using subframe or transmission time intervals (TTIs) of various or scalable lengths (e.g., containing varying number of OFDM symbols and/or lasting varying lengths of absolute time).

The gNBs 580a, 580b, 580c may be configured to communicate with the WTRUs 502a, 502b, 502c in a standalone configuration and/or a non-standalone configuration. In the standalone configuration, WTRUs 502a, 502b, 502c may communicate with gNBs 580a, 580b, 580c without also accessing other RANs (e.g., such as eNode-Bs 560a, 560b, 560c). In the standalone configuration, WTRUs 502a, 502b, 502c may utilize one or more of gNBs 580a, 580b, 580c as a mobility anchor point. In the standalone configuration, WTRUs 502a, 502b, 502c may communicate with gNBs 580a, 580b, 580c using signals in an unlicensed band. In a non-standalone configuration WTRUs 502a, 502b, 502c may communicate with/connect to gNBs 580a, 580b, 580c while also communicating with/connecting to another RAN such as eNode-Bs 560a, 560b, 560c. For example, WTRUs 502a, 502b, 502c may implement DC principles to communicate with one or more gNBs 580a, 580b, 580c and one or more eNode-Bs 560a, 560b, 560c substantially simultaneously. In the non-standalone configuration, eNode-Bs 560a, 560b, 560c may serve as a mobility anchor for WTRUs 502a, 502b, 502c and gNBs 580a, 580b, 580c may provide additional coverage and/or throughput for servicing WTRUs 502a, 502b, 502c.

Each of the gNBs 580a, 580b, 580c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 584a, 584b, routing of control plane information towards Access and Mobility Management Function (AMF) 582a, 582b and the like. As shown in FIG. 10D, the gNBs 580a, 580b, 580c may communicate with one another over an Xn interface.

The CN 515 shown in FIG. 10D may include at least one AMF 582a, 582b, at least one UPF 584a, 584b, at least one Session Management Function (SMF) 583a, 583b, and possibly a Data Network (DN) 585a, 585b. While each of the foregoing elements are depicted as part of the CN 515, it will be appreciated that any of these elements may be owned and/or operated by an entity other than the CN operator.

The AMF 582a, 582b may be connected to one or more of the gNBs 580a, 580b, 580c in the RAN 513 via an N2 interface and may serve as a control node. For example, the AMF 582a, 582b may be responsible for authenticating users of the WTRUs 502a, 502b, 502c, support for network slicing (e.g., handling of different PDU sessions with different requirements), selecting a particular SMF 583a, 583b, management of the registration area, termination of NAS signaling, mobility management, and the like. Network slicing may be used by the AMF 582a, 582b in order to customize CN support for WTRUs 502a, 502b, 502c based on the types of services being utilized WTRUs 502a, 502b, 502c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 562 may provide a control plane function for switching between the RAN 513 and other RANs (not shown) that employ other radio technologies, such as LTE, LTE-A, LTE-A Pro, and/or non-3GPP access technologies such as WiFi.

The SMF 583a, 583b may be connected to an AMF 582a, 582b in the CN 515 via an N11 interface. The SMF 583a, 583b may also be connected to a UPF 584a, 584b in the CN 515 via an N4 interface. The SMF 583a, 583b may select and control the UPF 584a, 584b and configure the routing of traffic through the UPF 584a, 584b. The SMF 583a, 583b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 584a, 584b may be connected to one or more of the gNBs 580a, 580b, 580c in the RAN 513 via an N3 interface, which may provide the WTRUs 502a, 502b, 502c with access to packet-switched networks, such as the Internet 510, to facilitate communications between the WTRUs 502a, 502b, 502c and IP-enabled devices. The UPF 584, 584b may perform other functions, such as routing and forwarding packets, enforcing user plane policies, supporting multi-homed PDU sessions, handling user plane QoS, buffering downlink packets, providing mobility anchoring, and the like.

The CN 515 may facilitate communications with other networks. For example, the CN 515 may include, or may communicate with, an IP gateway (e.g., an IP multimedia subsystem (IMS) server) that serves as an interface between the CN 515 and the PSTN 508. In addition, the CN 515 may provide the WTRUs 502a, 502b, 502c with access to the other networks 512, which may include other wired and/or wireless networks that are owned and/or operated by other service providers. In one embodiment, the WTRUs 502a, 502b, 502c may be connected to a local Data Network (DN) 585a, 585b through the UPF 584a, 584b via the N3 interface to the UPF 584a, 584b and an N6 interface between the UPF 584a, 584b and the DN 585a, 585b.

In view of FIGS. 10A-10D, and the corresponding description of FIGS. 10A-10D, one or more, or all, of the functions described herein with regard to one or more of: WTRU 502a-d, Base Station 514a-b, eNode-B 560a-c, MME 562, SGW 564, PGW 566, gNB 580a-c, AMF 582a-b, UPF 584a-b, SMF 583a-b, DN 585a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g. testing) wired and/or wireless communication network in order to implement testing of one or more components. The one or more emulation devices may be test equipment. Direct RF coupling and/or wireless communications via RF circuitry (e.g. which may include one or more antennas) may be used by the emulation devices to transmit and/or receive data.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

This application describes a variety of aspects, including tools, features, embodiments, models, approaches, and/or the like. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 11:
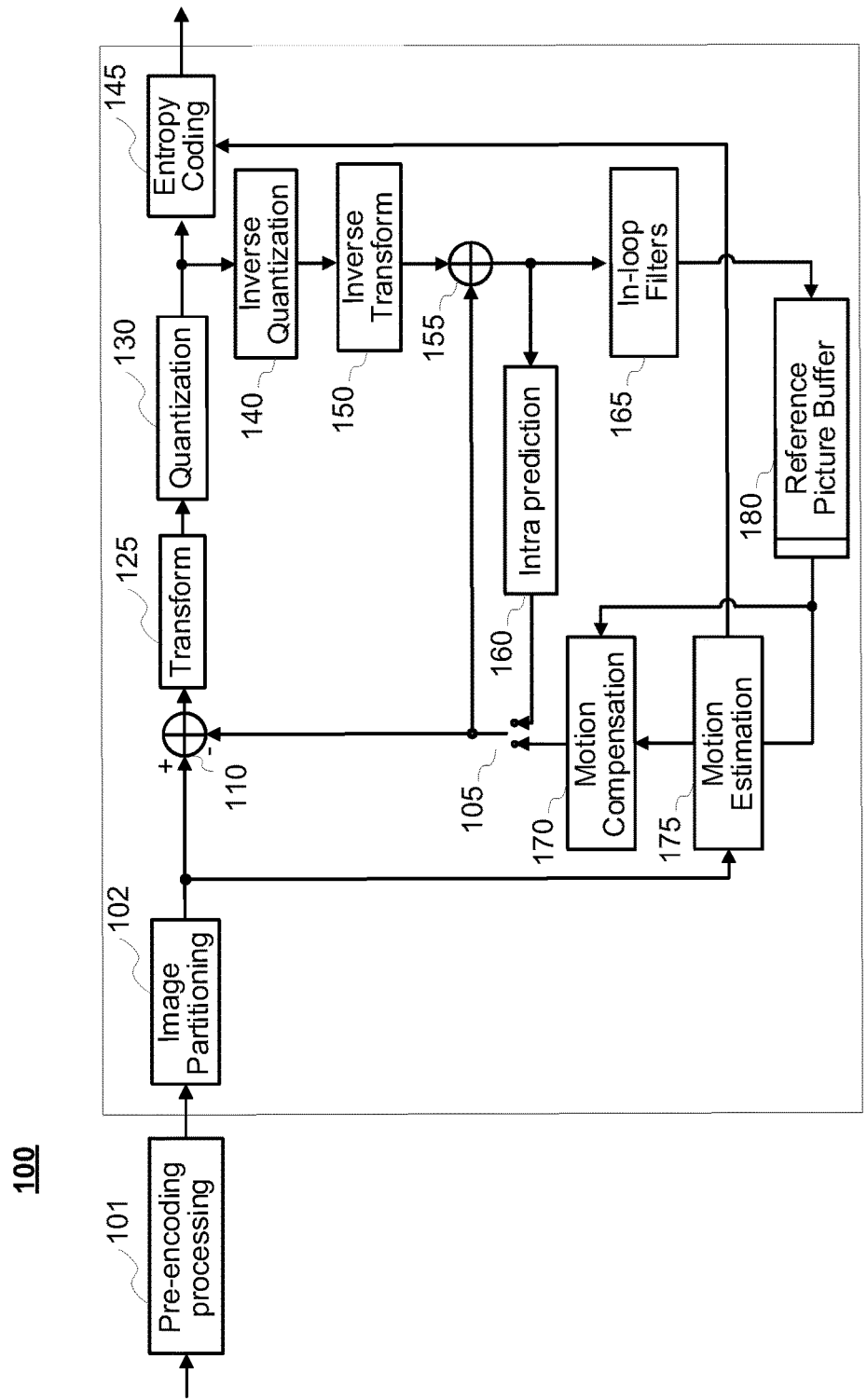
FIG. 11 illustrates an example encoder.
Figure 12:
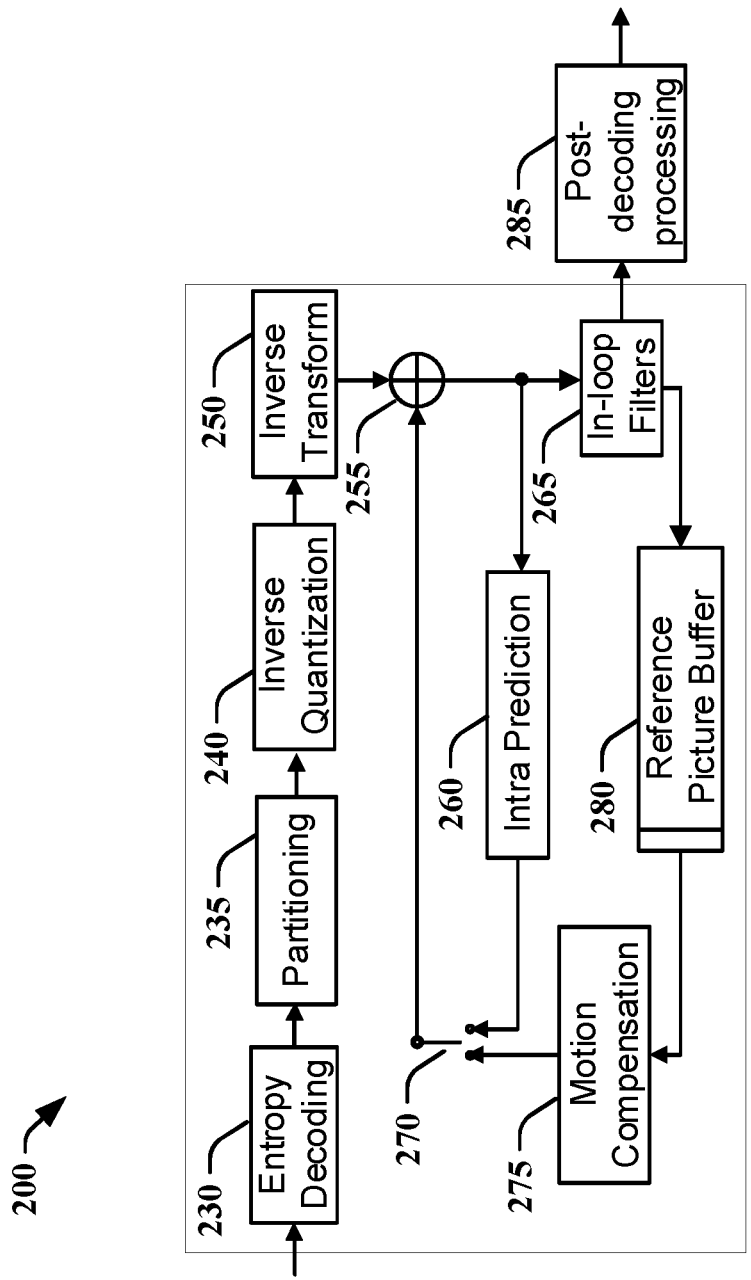
FIG. 12 illustrates an example decoder.
Figure 13:
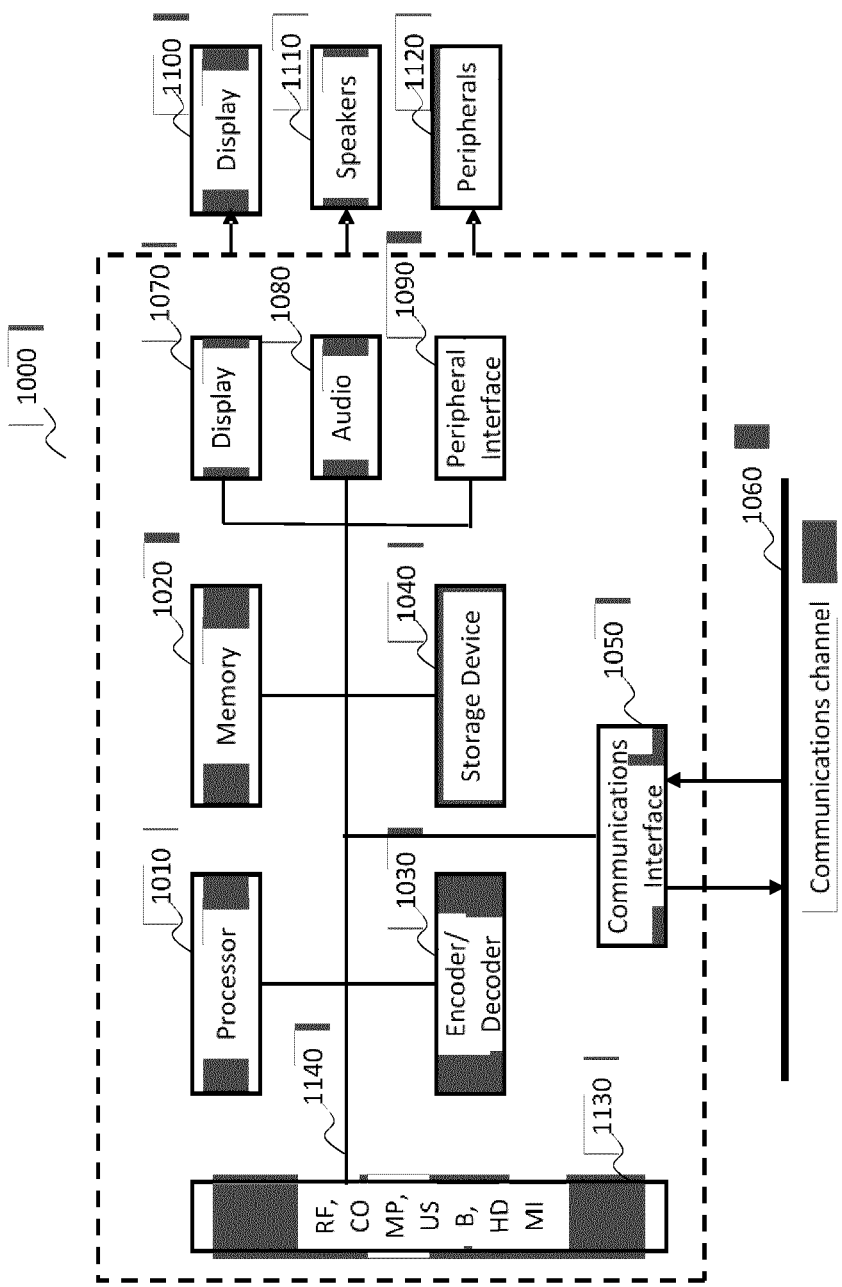
FIG. 13 illustrates a block diagram of an example of a system in which various aspects and embodiments are implemented.

The aspects described and contemplated in this application can be implemented in many different forms. FIGS. 11, 12, and 13 provide some embodiments, but other embodiments are contemplated and the discussion of FIGS. 11, 12 and 13 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

The aspects described and contemplated in this application can be implemented in many different forms. FIGS. 11, 12, and 13 below provide some examples, but other examples are contemplated and the discussion of FIGS. 11, 12, and 13 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various examples to modify an element, component, step, operation, etc., such as, for example, a "first transform unit" and a "second transform unit". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, for example, the intra prediction, entropy coding, and/or decoding modules (160, 260, 145, 230), of a video encoder 100 and decoder 200 as shown in FIG. 11 and FIG. 12. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example, size of quantization matrix of 2×2, 4×4, and 8×8; an aligned grid of 4×4, 8×8, or 16×16 luma samples, a CU size 64×64 or 128×128 pixels; a value of tu_qp_delta_enabled_flag 0 or 1 etc. The specific values are for example purposes and the aspects described are not limited to these specific values.

FIG. 11 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (for example, conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 12 illustrates a block diagram of a video decoder 200. In the decoder 200, a bitstream is decoded by the decoder elements as described below. Video decoder 200 generally performs a decoding pass reciprocal to the encoding pass as described in FIG. 11. The encoder 100 also generally performs video decoding as part of encoding video data. For example, the encoder 100 may perform one or more of the video decoding steps presented herein. The encoder reconstructs the decoded images, for example, to maintain synchronization with the decoder with respect to one or more of the following: reference pictures, entropy coding contexts, and other decoder-relevant state variables.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (for example, conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 13 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (for example, a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or WC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 10, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other devices. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples. When the processor 1010 encompasses multiple processors, the multiple processors can share the operations related to the embodiments.

Various implementations involve decoding. "Decoding", as used in this application, can encompass all or part of the processes performed, for example, on a received encoded sequence in order to produce a final output suitable for display. In various examples, such processes include one or more of the processes typically performed by a decoder, for example, entropy decoding, inverse quantization, inverse transformation, and differential decoding. In various examples, such processes also, or alternatively, include processes performed by a decoder of various implementations described in this application, for example, receiving a TU QP adjustment enablement indication; determining a luma quantization parameter for a TU based on a TU QP adjustment value; performing de-quantization on a TU based on a luma QP; receiving a QP adjustment value associated with a syntax level at the syntax level; obtaining the QP adjustment value associated with the syntax level via signalling at the syntax level (for example, via a syntax element signalled at the syntax level); obtaining a QP delta (for example, a difference) between a QP associated with the syntax level and a prediction of the QP associated with the syntax level; applying the QP adjustment value to a QP associated with the syntax level to obtain an adjusted QP associated with the syntax level; determining a syntax level as a coding block level or a TU level; receiving the QP adjustment value for a first CU (for example, a current TU), for example, if the syntax level is a TU level; determining the first TU in a first QG; determining that the first comprises the first CU and a second TU that precedes the first TU in a coding order; obtaining a QP for the second TU based on a QP predictor; obtaining the QP for the second TU based on a QP predictor instead of the QP adjustment value for the first TU; obtaining the QP predictor based on a QP adjustment value associated with a slice level; obtaining the QP predictor based on a QP for a TU that is adjacent to the second TU or QP(s) for TUs that are adjacent to the second TU; determining that the TU that is adjacent to the second TU may be in a second QG that precedes the first QG in a coding order; determining that the first QG may include a third TU that follows the first TU in a coding order; obtaining a QP for the third TU based on the adjusted QP for the first TU when it is determined that the third TU follows the first TU in the coding order; determining whether to use the adjusted QP for the first TU on the second TU (or the third TU) based on a coding order associated with the first TU and the second TU; determining, that, on a condition that the second TU follows the first TU in the coding order, the adjusted QP for the first TU may be used on the second TU; determining that, on a condition that the second TU precedes the first TU in the coding order, the QP for the second TU may be determined based on a QP predictor; determining whether a QP adjustment value indication for a TU (for example, the first TU) is to be decoded; determining whether the QP adjustment value indication for the TU (for example, the first TU) is to be decoded based in part on a width or a height of a transform block associated with the TU; decoding the QP adjustment value indication for the TU on a condition that the width or height of the transform block associated with the TU is less than a predetermined value; processing a video based on the adjusted QP; performing de-quantization on the first TU based on the adjusted QP and perform deblock filtering on the second TU or the third TU based on the adjusted QP.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, obtaining a QP adjustment value associated with a syntax level; obtaining a QP delta (for example, a difference) between a QP associated with a syntax level and a prediction of the QP associated with the syntax level; applying the QP adjustment value to a QP associated with a syntax level to obtain an adjusted QP associated with the syntax level; determining a syntax level as a coding block level or a TU level; obtaining the QP adjustment value for a first CU (for example, a current TU), for example, if the syntax level is a TU level; determining the first TU in a first QG; determining that the first QG comprises the first CU and a second TU that precedes the first TU in a coding order; obtaining a QP for the second TU based on a QP predictor; obtaining the QP for the second TU based on a QP predictor instead of the QP adjustment value for the first TU; obtaining the QP predictor based on a QP adjustment value associated with a slice level; obtaining the QP predictor based on a QP for a TU that is adjacent to the second TU or QP(s) for TUs that are adjacent to the second TU; determining that the TU that is adjacent to the second TU may be in a second QG that precedes the first QG in a coding order; determining that the first QG may include a third TU that follows the first TU in a coding order; obtaining a QP for the third TU based on the adjusted QP for the first TU when it is determined that the third TU follows the first TU in the coding order; determining whether to use the adjusted QP for the first TU on a second TU based on a coding order associated with the first TU and the second TU; determining, that, on a condition that the second TU follows the first TU in the coding order, the adjusted QP for the first TU may be used on the second TU; determining that, on a condition that the second TU precedes the first TU in the coding order, the QP for the second TU may be determined based on a QP predictor; processing a video based on the adjusted QP; performing de-quantization on the first TU based on the adjusted QP and performing deblock filtering on a the first TU and a second TU based on the adjusted QP; including the QP adjustment value applied to a syntax level at the same syntax level of a bitstream; including an indication of TU QP adjustment value at the TU level in the bitstream; including an indication of CU QP adjustment value at the CU level in the bitstream.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, transform_unit, coding_unit, cu_qp_delta_sign_flag, cu_qp_delta_abs, TuQpDeltaSubdiv, TuChromaQpOffsetSubdiv, IsTuChromaQpOffsetCoded, tu_chroma_qp_offset_enabled_flag, tu_qp_delta_enabled_flag, and IsTuQpDeltaCoded and other syntax elements as shown and described with respect to Tables 2-6 are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

During the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one example" or "an example" or "one implementation" or "an implementation", as well as other variations thereof, means that a particular feature, structure, characteristic, and so forth described in connection with the example is included in at least one example. Thus, the appearances of the phrase "in one example" or "in an example" or "in one implementation" or "in an implementation", as well any other variations, appearing in various places throughout this application are not necessarily all referring to the same example.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments, a decoder may predict a QP for subsequent TUs based on the TU QP adjustment value received for a previous TU, or a decoder may predict a QP based on a slice level QP. One or more of an indication of a QP adjustment value, a quantization matrix and/or quantization matrix identifier, a value of the difference between the QP of the current transform unit and its prediction, the sign of the QP adjustment value associated with the TU level, the index into one or more of the following chroma QP offset lists, QP delta enablement indicator may be signaled, for example, to indicate to the decoder whether one or more of them are enabled or disabled, or their value. In this way, in an example the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of examples and embodiments. Features of these examples and embodiments can be provided alone or in any combination, across various claim categories and types. Further, examples can include one or more of the following features, devices, or aspects, alone or in any combination, across various claim categories and types.

The quantization parameter coding (for example, encoding and/or decoding) process applied in the decoder and/or encoder may be modified. Several QP coding methods in the decoder and/or encoder may be enabled. The QP coding method for deriving the QP at the decoder may be applied.

A decoder may perform method 1400 as described in FIG. 14. FIG. 14 illustrates an example of a method for QP adjustment based on at least the examples shown in one or more of FIG. 8B, FIG. 9B, Table 5 and Table 6. For example, a decoder may receive a QP adjustment value associated with a syntax level at the syntax level. In examples, the decoder may obtain the QP adjustment value associated with the syntax level, for example, via signalling at the syntax level. The QP adjustment value associated with the syntax level may comprise a QP delta (for example, a difference) between a QP associated with the syntax level and a prediction of the QP associated with the syntax level. The decoder may apply the QP adjustment value to a QP associated with the syntax level to obtain an adjusted QP associated with the syntax level. The syntax level may include a coding block level or a TU level. In examples, if the syntax level is a TU level, the decoder may receive the QP adjustment value for a first CU (for example, a current TU). The first TU may be in a first QG. The first QG may comprise the first CU and a second TU that precedes the first TU in a coding order. The decoder may obtain a QP for the second TU based on a QP predictor. In examples, the decoder may obtain the QP for the second TU based on a QP predictor instead of the QP adjustment value for the first TU. The QP predictor may be obtained based on a QP adjustment value associated with a slice level. The QP predictor may be obtained based on a QP for a TU that is adjacent to the second TU or QP(s) for TUs that are adjacent to the second TU. For example, the TU that is adjacent to the second TU may be in a second QG that precedes the first QG in a coding order. The first QG may include a third TU that follows the first TU in a coding order. The decoder may obtain a QP for the third TU based on the adjusted QP for the first TU, for example, when the decoder determines that the third TU follows the first TU in the coding order. In examples, the decoder may determine whether to use the adjusted QP for the first TU on the second TU (or the third TU) based on a coding order associated with the first TU and the second TU. On a condition that the second TU follows the first TU in the coding order, the adjusted QP for the first TU may be used on the second TU. On a condition that the second TU precedes the first TU in the coding order, the QP for the second TU may be determined based on a QP predictor. The decoder may determine whether a QP adjustment value indication for a TU (for example, the first TU) is to be decoded. For example, the decoder may determine whether the QP adjustment value indication for the TU (for example, the first TU) is to be decoded based in part on a width or a height of a transform block associated with the TU and decode the QP adjustment value indication for the TU on a condition that the width or height of the transform block associated with the TU is less than a predetermined value. The decoder may process a video based on the adjusted QP. For example, the decoder may perform de-quantization on the first TU based on the adjusted QP and perform deblock filtering on the second TU or the third TU based on the adjusted QP.

Decoding tools and techniques including one or more of entropy decoding, inverse quantization, inverse transformation, and differential decoding may be used to enable the method as described in FIG. 14 in the decoder. These decoding tools and techniques may be used to enable one or more of receiving a TU QP adjustment enablement indication; determining a luma quantization parameter for a TU based on a TU QP adjustment value; performing de-quantization on a TU based on a luma QP; receiving a QP adjustment value associated with a syntax level at the syntax level; obtaining the QP adjustment value associated with the syntax level via signalling at the syntax level (for example, via a syntax element signalled at the syntax level); obtaining a QP delta (for example, a difference) between a QP associated with the syntax level and a prediction of the QP associated with the syntax level; applying the QP adjustment value to a QP associated with the syntax level to obtain an adjusted QP associated with the syntax level; determining a syntax level as a coding block level or a TU level; receiving the QP adjustment value for a first CU (for example, a current TU), for example, if the syntax level is a TU level; determining the first TU in a first QG; determining that the first comprises the first CU and a second TU that precedes the first TU in a coding order; obtaining a QP for the second TU based on a QP predictor; obtaining the QP for the second TU based on a QP predictor instead of the QP adjustment value for the first TU; obtaining the QP predictor based on a QP adjustment value associated with a slice level; obtaining the QP predictor based on a QP for a TU that is adjacent to the second TU or QP(s) for TUs that are adjacent to the second TU; determining that the TU that is adjacent to the second TU may be in a second QG that precedes the first QG in a coding order; determining that the first QG may include a third TU that follows the first TU in a coding order; obtaining a QP for the third TU based on the adjusted QP for the first TU when it is determined that the third TU follows the first TU in the coding order; determining whether to use the adjusted QP for the first TU on the second TU (or the third TU) based on a coding order associated with the first TU and the second TU; determining, that, on a condition that the second TU follows the first TU in the coding order, the adjusted QP for the first TU may be used on the second TU; determining that, on a condition that the second TU precedes the first TU in the coding order, the QP for the second TU may be determined based on a QP predictor; determining whether a QP adjustment value indication for a TU (for example, the first TU) is to be decoded; determining whether the QP adjustment value indication for the TU (for example, the first TU) is to be decoded based in part on a width or a height of a transform block associated with the TU; decoding the QP adjustment value indication for the TU on a condition that the width or height of the transform block associated with the TU is less than a predetermined value; processing a video based on the adjusted QP; performing de-quantization on the first TU based on the adjusted QP and perform deblock filtering on the second TU or the third TU based on the adjusted QP; and other decoder behaviors that are related to any of the above.

An encoder may perform operations related to method 1400 as described in FIG. 14. For example, an encoder may obtain a QP adjustment value associated with a syntax level. The QP adjustment value associated with the syntax level may comprise a QP delta (for example, a difference) between a QP associated with the syntax level and a prediction of the QP associated with the syntax level. The encoder may apply the QP adjustment value to a QP associated with the syntax level to obtain an adjusted QP associated with the syntax level. The syntax level may include a coding block level or a TU level. In examples, if the syntax level is a TU level, the encoder may obtain the QP adjustment value for a first CU (for example, a current TU). The first TU may be in a first QG. The first QG may comprise the first CU and a second TU that precedes the first TU in a coding order. The encoder may obtain a QP for the second TU based on a QP predictor. In examples, the encoder may obtain the QP for the second TU based on a QP predictor instead of the QP adjustment value for the first TU. The QP predictor may be obtained based on a QP adjustment value associated with a slice level. The QP predictor may be obtained based on a QP for a TU that is adjacent to the second TU or QP(s) for TUs that are adjacent to the second TU. For example, the TU that is adjacent to the second TU may be in a second QG that precedes the first QG in a coding order. The first QG may include a third TU that follows the first TU in a coding order. The encoder may obtain a QP for the third TU based on the adjusted QP for the first TU, for example, when the encoder determines that the third TU follows the first TU in the coding order. In examples, the encoder may determine whether to use the adjusted QP for the first TU on a second TU based on a coding order associated with the first TU and the second TU, wherein on a condition that the second TU follows the first TU in the coding order, the adjusted QP for the first TU may be used on the second TU, and on a condition that the second TU precedes the first TU in the coding order, the QP for the second TU is determined based on a QP predictor. The encoder may process a video based on the adjusted QP. For example, the encoder may perform de-quantization on the first TU based on the adjusted QP and perform deblock filtering on the first TU and a second TU based on the adjusted QP. The encoder may include the QP adjustment value applied to a syntax level at the same syntax level of a bitstream. For example, the encoder may include an indication of TU QP adjustment value at the TU level in the bitstream, as shown in Table 5. For example, the encoder may include an indication of CU QP adjustment value at the CU level in the bitstream, as shown in Table 6.

Encoding tools and techniques including one or more of quantization, entropy coding, inverse quantization, inverse transformation, and differential coding may be used to enable operations related to the method as described in FIG. 14, in the encoder. These encoding tools and techniques may be used to enable one or more of obtaining a QP adjustment value associated with a syntax level; obtaining a QP delta (for example, a difference) between a QP associated with a syntax level and a prediction of the QP associated with the syntax level; applying the QP adjustment value to a QP associated with a syntax level to obtain an adjusted QP associated with the syntax level; determining a syntax level as a coding block level or a TU level; obtaining the QP adjustment value for a first CU (for example, a current TU), for example, if the syntax level is a TU level; determining the first TU in a first QG; determining that the first QG comprises the first CU and a second TU that precedes the first TU in a coding order; obtaining a QP for the second TU based on a QP predictor; obtaining the QP for the second TU based on a QP predictor instead of the QP adjustment value for the first TU; obtaining the QP predictor based on a QP adjustment value associated with a slice level; obtaining the QP predictor based on a QP for a TU that is adjacent to the second TU or QP(s) for TUs that are adjacent to the second TU; determining that the TU that is adjacent to the second TU may be in a second QG that precedes the first QG in a coding order; determining that the first QG may include a third TU that follows the first TU in a coding order; obtaining a QP for the third TU based on the adjusted QP for the first TU when it is determined that the third TU follows the first TU in the coding order; determining whether to use the adjusted QP for the first TU on a second TU based on a coding order associated with the first TU and the second TU; determining, that, on a condition that the second TU follows the first TU in the coding order, the adjusted QP for the first TU may be used on the second TU; determining that, on a condition that the second TU precedes the first TU in the coding order, the QP for the second TU may be determined based on a QP predictor; processing a video based on the adjusted QP; performing de-quantization on the first TU based on the adjusted QP and performing deblock filtering on a the first TU and a second TU based on the adjusted QP; including the QP adjustment value applied to a syntax level at the same syntax level of a bitstream; include an indication of TU QP adjustment value at the TU level in the bitstream, as shown in Table 5; including an indication of CU QP adjustment value at the CU level in the bitstream, as shown in Table 6. and other encoder behaviors that are related to any of the above.

Signalling syntax elements that enable the decoder to identify the QP coding method to use may be inserted. A syntax element(s) may be inserted in the signaling, for example, to enable the decoder to identify an indication associated with performing the method as described in FIG. 14, or the method to use. For example, the syntax element may include one or more of an indication of a QP adjustment value, a quantization matrix and/or quantization matrix identifier, a value of the difference between the QP of the current transform unit and its prediction, the sign of the QP adjustment value associated with the TU level, the index into one or more of the following chroma QP offset lists, QP delta enablement indicator, for example, to indicate to the decoder whether one or more of them are enabled or disabled, or their value.

The QP prediction method to apply at the decoder may be selected, based on syntax elements described herein. The method as described in FIG. 14 may be selected and/or applied, for example, based on the syntax element(s) to apply at the decoder. For example, the decoder may receive a value of the difference between the QP of the current transform unit and its prediction. Based on the value, the decoder may perform a method as described in FIG. 14 to obtain the adjusted QP.

The encoder may adapt prediction residual based on one or more examples herein. A residual may be obtained, for example, by subtracting a predicted video block from the original image block. For example, the encoder may predict a video block using the adjusted QP that is obtained as described herein. The encoder may obtain the original image block and subtract the predicted video block from the original image block to generate a prediction residual.

A bitstream or signal may include one or more of the described syntax elements, or variations thereof. For example, a bitstream or signal may include a syntax element(s) that indicates any of a QP adjustment value, a quantization matrix and/or quantization matrix identifier, a value of the difference between the QP of the current transform unit and its prediction, the sign of the QP adjustment value associated with the TU level, the index into one or more of the following chroma QP offset lists, or QP delta enablement indicator.

A bitstream or signal may include syntax conveying information generated according to any of the examples described. For example, information or data may be generated in performing the example as shown in FIG. 14. The generated information or data may be conveyed in syntax included in the bitstream or signal.

The signaling syntax elements that enable the decoder to adapt residues in a manner corresponding to that used by an encoder may be inserted. For example, the residual may be generated using one or more examples herein.

A bitstream or signal that includes one or more of the described syntax elements, or variations thereof may be created and/or transmitted and/or received and/or decoded. Any of the examples described may be created and/or transmitted and/or received.

A method, process, apparatus, medium storing instructions, medium storing data, or signal for creating and/or transmitting and/or receiving and/or decoding a bitstream or signal that includes one or more of the described syntax elements, or variations thereof.

A method, process, apparatus, medium storing instructions, medium storing data, or signal according to any of the examples described may be implemented.

A method, process, apparatus, medium storing instructions, medium storing data, or signal according to, but not limited to one or more of the following: obtaining a QP as described in examples herein; adjusting QP as described in FIG. 14 or as described in examples herein; receiving a QP adjustment value as described in examples herein; receiving a QP adjustment value associated with the syntax level at the syntax level as described in FIG. 14; obtaining a QP adjustment value as described in examples herein; obtaining an adjusted QP associated with the syntax level as described in FIG. 14; defining a QP adjustment value as described in examples herein; using a QP adjustment value as described in examples herein; applying the QP adjustment value associated with the syntax level at the syntax level as described in FIG. 14; receiving a QP adjustment value indication as described in examples herein; decoding a QP adjustment value indication as described in examples herein; processing a video or other forms of media content based on the adjusted QP as described in FIG. 14 or as described in examples herein; receiving a QP adjustment value associated with a syntax level at the syntax level; obtaining the QP adjustment value associated with the syntax level via signalling at the syntax level (for example, via a syntax element signalled at the syntax level); obtaining a QP delta (for example, a difference) between a QP associated with the syntax level and a prediction of the QP associated with the syntax level; applying the QP adjustment value to a QP associated with the syntax level to obtain an adjusted QP associated with the syntax level; determining a syntax level as a coding block level or a TU level; receiving the QP adjustment value for a first CU (for example, a current TU), for example, if the syntax level is a TU level; determining the first TU in a first QG; determining that the first comprises the first CU and a second TU that precedes the first TU in a coding order; obtaining a QP for the second TU based on a QP predictor; obtaining the QP for the second TU based on a QP predictor instead of the QP adjustment value for the first TU; obtaining the QP predictor based on a QP adjustment value associated with a slice level; obtaining the QP predictor based on a QP for a TU that is adjacent to the second TU or QP(s) for TUs that are adjacent to the second TU; determining that the TU that is adjacent to the second TU may be in a second QG that precedes the first QG in a coding order; determining that the first QG may include a third TU that follows the first TU in a coding order; obtaining a QP for the third TU based on the adjusted QP for the first TU when it is determined that the third TU follows the first TU in the coding order; determining whether to use the adjusted QP for the first TU on a second TU based on a coding order associated with the first TU and the second TU; determining, that, on a condition that the second TU follows the first TU in the coding order, the adjusted QP for the first TU may be used on the second TU; determining that, on a condition that the second TU precedes the first TU in the coding order, the QP for the second TU may be determined based on a QP predictor; determining whether a QP adjustment value indication for a TU (for example, the first TU) is to be decoded; determining whether the QP adjustment value indication for the TU (for example, the first TU) is to be decoded based in part on a width or a height of a transform block associated with the TU; decoding the QP adjustment value indication for the TU on a condition that the width or height of the transform block associated with the TU is less than a predetermined value; processing a video based on the adjusted QP; performing de-quantization on the first TU based on the adjusted QP and perform deblock filtering on the second TU or the third TU based on the adjusted QP.

A TV, set-top box, cell phone, tablet, or other electronic device may perform quantization parameter coding (for example, encoding and/or decoding) according to any of the examples described. A TV, set-top box, cell phone, tablet, or other electronic device may perform quantization parameter coding (for example, encoding and/or decoding) according to any of the examples described and may display (for example, using a monitor, screen, or other type of display) a resulting image. A TV, set-top box, cell phone, tablet, or other electronic device may select (for example, using a tuner) a channel to receive a signal including an encoded image, and may perform quantization parameter decoding according to any of the examples described. A TV, set-top box, cell phone, tablet, or other electronic device may receive (for example, using an antenna) a signal over the air that may include an encoded image, and may perform quantization parameter decoding according to any of the examples described.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A video decoding apparatus, comprising:
   a processor configured to:
   receive a quantization parameter (QP) adjustment value;
   apply the received QP adjustment value to a QP associated with a first transform unit (TU) to obtain an adjusted QP associated with the first TU; and
   decode a video using the adjusted QP associated with the first TU based on at least one of a plurality of constraints on back-propagation of the adjusted QP.

2. The video decoding apparatus of claim 1, wherein the plurality of constraints comprises a constraint where the first TU precedes a second TU in a decoding order and does not comprise a non-zero coefficient.

3. The video decoding apparatus of claim 2, wherein a QP associated with a third TU that follows the first TU in the decoding order is obtained based on the received QP adjustment value.

4. The video decoding apparatus of claim 1, wherein the QP adjustment value is received at a TU level.

5. The video decoding apparatus of claim 1, wherein the plurality of constraints comprises a constraint where, for a second TU that precedes the first TU in a decoding order, a QP associated with the second TU is obtained based on a QP predictor, wherein the video is decoded further using the obtained QP associated with the second TU.

6. The video decoding apparatus of claim 5, wherein a QP associated with a third TU that follows the first TU in the decoding order is obtained based on the received QP adjustment value.

7. The video decoding apparatus of claim 5, wherein the QP for the second TU is obtained based on the QP predictor instead of the received QP adjustment value, and wherein the first TU and the second TU are associated with a quantization group.

8. The video decoding apparatus of claim 5, wherein the first TU is dequantized using the adjusted QP associated with the first TU, and wherein the second TU is dequantized using the obtained QP associated with the second TU.

9. The video decoding apparatus of claim 5, wherein the processor is configured to:
   determine a QP for one or more TUs that are adjacent to the second TU; and
   obtain the QP predictor based on the QP for the one or more TUs that are adjacent to the second TU.

10. A video decoding method, comprising:
    receiving a quantization parameter (QP) adjustment value;
    applying the received QP adjustment value to a QP associated with a first transform unit (TU) to obtain an adjusted QP associated with the first TU; and
    decoding a video using the adjusted QP associated with the first TU based on at least one of a plurality of constraints on back-propagation.

11. The video decoding method of claim 10, wherein the plurality of constraints comprises a constraint where the first TU precedes a second TU in a decoding order and does not comprise a non-zero coefficient.

12. The video decoding method of claim 10, wherein the QP adjustment value is received at a TU level.

13. The video decoding method of claim 10, wherein the plurality of constraints comprises a constraint where, for a second TU that precedes the first TU in a decoding order, a QP associated with the second TU is obtained based on a QP predictor, wherein the video is decoded further using the obtained QP associated with the second TU.

14. The video decoding method of claim 13, wherein the QP for the second TU is obtained based on the QP predictor instead of the received QP adjustment value, and wherein the first TU and the second TU are associated with a quantization group.

15. The video decoding method of claim 13, wherein the first TU is dequantized using the adjusted QP associated with the first TU, and wherein the second TU is dequantized using the obtained QP associated with the second TU.

16. The video decoding method of claim 13, comprising:
    determining a QP for one or more TUs that are adjacent to the second TU; and
    obtaining the QP predictor based on the QP for the one or more TUs that are adjacent to the second TU.

17. A non-transitory computer readable medium including instructions for causing one or more processors to perform the video decoding method of claim 10.

18. A video encoding apparatus, comprising:
    a processor configured to:
    determine a quantization parameter (QP) adjustment value;
    apply the determined QP adjustment value to a QP associated with a first transform unit (TU) to obtain an adjusted QP associated with the first TU; and
    encode a video using the adjusted QP associated with the first TU based on at least one of a plurality of constraints on back-propagation.

19. The video encoding apparatus of claim 18, wherein the plurality of constraints comprises a constraint where the first TU precedes a second TU in a decoding order and does not comprise a non-zero coefficient.

20. The video encoding apparatus of claim 18, wherein the plurality of constraints comprises a constraint where, for a second TU that precedes the first TU in a decoding order, a QP associated with the second TU is obtained based on a QP predictor, wherein the video is decoded further using the obtained QP associated with the second TU.

* * * * *